(12) United States Patent
Panzer et al.

(10) Patent No.: US 10,769,967 B2
(45) Date of Patent: Sep. 8, 2020

(54) SYSTEM, METHOD AND COMPUTER READABLE MEDIUM FOR QUANTIFYING ANATOMICAL DEVICE DEFORMATION UNDER LOAD

(71) Applicant: University of Virginia Patent Foundation, Charlottesville, VA (US)

(72) Inventors: Matthew B. Panzer, Charlottesville, VA (US); Jason L. Forman, Charlottesville, VA (US); Jean S. G. Vilar, Delray Beach, FL (US); Ahmed Alshareef, Columbia, SC (US)

(73) Assignee: University of Virginia Patent Foundation, Charlottesville, VA (US)

( * ) Notice: Subject to any disclaimer, the term of this patent is extended or adjusted under 35 U.S.C. 154(b) by 197 days.

(21) Appl. No.: 15/879,649

(22) Filed: Jan. 25, 2018

(65) Prior Publication Data
US 2018/0211568 A1    Jul. 26, 2018

Related U.S. Application Data

(60) Provisional application No. 62/450,118, filed on Jan. 25, 2017, provisional application No. 62/620,166, filed on Jan. 22, 2018.

(51) Int. Cl.
| | |
|---|---|
| *G09B 23/28* | (2006.01) |
| *G09B 23/32* | (2006.01) |
| *G09B 9/00* | (2006.01) |
| *G01S 5/26* | (2006.01) |
| *G01M 7/08* | (2006.01) |

(52) U.S. Cl.
CPC ........... *G09B 23/32* (2013.01); *G01M 7/08* (2013.01); *G01S 5/26* (2013.01); *G09B 9/00* (2013.01); *G09B 23/285* (2013.01); *G09B 23/288* (2013.01)

(58) Field of Classification Search
USPC ......... 434/262, 267, 270, 272, 274; 73/1.15, 73/1.82, 866.4
See application file for complete search history.

(56) References Cited

U.S. PATENT DOCUMENTS

| | | | | | |
|---|---|---|---|---|---|
| 4,161,874 | A | * | 7/1979 | Specker | ................. G01M 7/08 73/12.01 |
| 4,409,835 | A | * | 10/1983 | Daniel | .................. A61B 5/103 434/274 |

(Continued)

OTHER PUBLICATIONS

Alshareef et al., "A Novel Method for Quantifying Human in Situ Whole Brain Deformation Under Rotational Loading Using Sonomicrometry", Journal of Neurotrauma, Mar. 1, 2018, pp. 780-789, vol. 35.

(Continued)

*Primary Examiner* — Kurt Fernstrom
(74) *Attorney, Agent, or Firm* — Robert J. Decker

(57) ABSTRACT

An automated method and system of determining movement and/or deformation of an anthropomorphic test device (ATD). The method and system includes an acoustic transmitter device located on a first region of the ATD and an acoustic receiver device located on a second region of the ATD. An electric field is provided in communication with the acoustic transmitter to activate the acoustic transmitter for generating mechanical waves to be received by the acoustic receiver. Relative locations of the acoustic transmitter device and the acoustic receiver device are determined by the time of flight of the generated mechanical wave traveling from the acoustic transmitter device to the acoustic receiver device while the first region of the ATD and/or the second region of the ATD are subjected to movement and/or deformation; and determining movement and/or deformation data of the second region of the ATD. Information may be transmitted that represents the movement and/or deformation data of the second region, or information may be presented that represent the movement and/or deformation data of the second region on a display.

51 Claims, 26 Drawing Sheets

(56) References Cited

U.S. PATENT DOCUMENTS

| | | | | |
|---|---|---|---|---|
| 4,691,556 | A * | 9/1987 | Mellander | G01M 17/0078 73/1.15 |
| 5,317,931 | A * | 6/1994 | Kalami | G01B 5/30 33/760 |
| 6,131,436 | A * | 10/2000 | O'Bannon | B25J 11/00 73/7 |
| 7,508,530 | B1 * | 3/2009 | Handman | G01S 5/16 356/614 |
| 8,364,435 | B2 * | 1/2013 | Battenberg | G01M 99/001 702/113 |
| 9,243,966 | B2 * | 1/2016 | Beillas | G01M 7/08 |
| 9,335,225 | B2 * | 5/2016 | Xu | G01L 1/005 |
| 9,826,954 | B2 * | 11/2017 | Petel | A61B 5/1128 |
| 9,903,702 | B2 * | 2/2018 | Verschut | G01B 7/18 |
| 2007/0058163 | A1 * | 3/2007 | Handman | G01C 3/22 356/152.1 |

OTHER PUBLICATIONS

Alshareef et al., "Evaluating the Biofidelity of Human Brain Finite Element Models Using Sonomicrometry Data", IRCOBI conference 2017, IRC-17-96, Sep. 13-15, 2017, pp. 701-702, Antwerp, Belgium.

Darling, "Finite Element Modeling of Human Brain Response to Football Helmet Impacts", a Thesis Presented in Partial Fulfillment of the Requirements for the Degree Master of Science, Arizona State University, Dec. 2014, 71 pages.

Giudice et aL, "Measuring 3D Brain Deformation During Dynamic Head Motion Using Sonomicrometry", IRCOBI conference 2017, IRC-17-89, Sep. 13-15, 2017, pp. 674-676, Antwerp, Belgium.

Lee et al., "Blast-induced electromagnetic fields in the brain from bone piezoelectricity", NeuroImage, 2011 (online jun. 2010), pp. S30-S36, vol. 54.

Rouhana et al., "Development of a Reusable, Rate-Sensitive Abdomen for the Hybrid III Family of Dummies", SAE Technical Paper Series, 2001-22-0002, Nov. 2001, Stapp Car Crash Journal, pp. 1-27, vol. 45.

Ryan et al., "Functional Evidence of Reversible Ischemic Injury Immediately After the Sympathetic Storm Associated with Experimental Brain Death", The Journal of Heart and Lung Transplantation, Aug. 2003, pp. 922-928, vol. 22, No. 8.

Takhounts et al., "On the Development of the SIMon Finite Element Head Model", Stapp Car Crash Journal, Oct. 2003, pp. 107-133, vol. 47, ProQuest SciTech Collection.

* cited by examiner

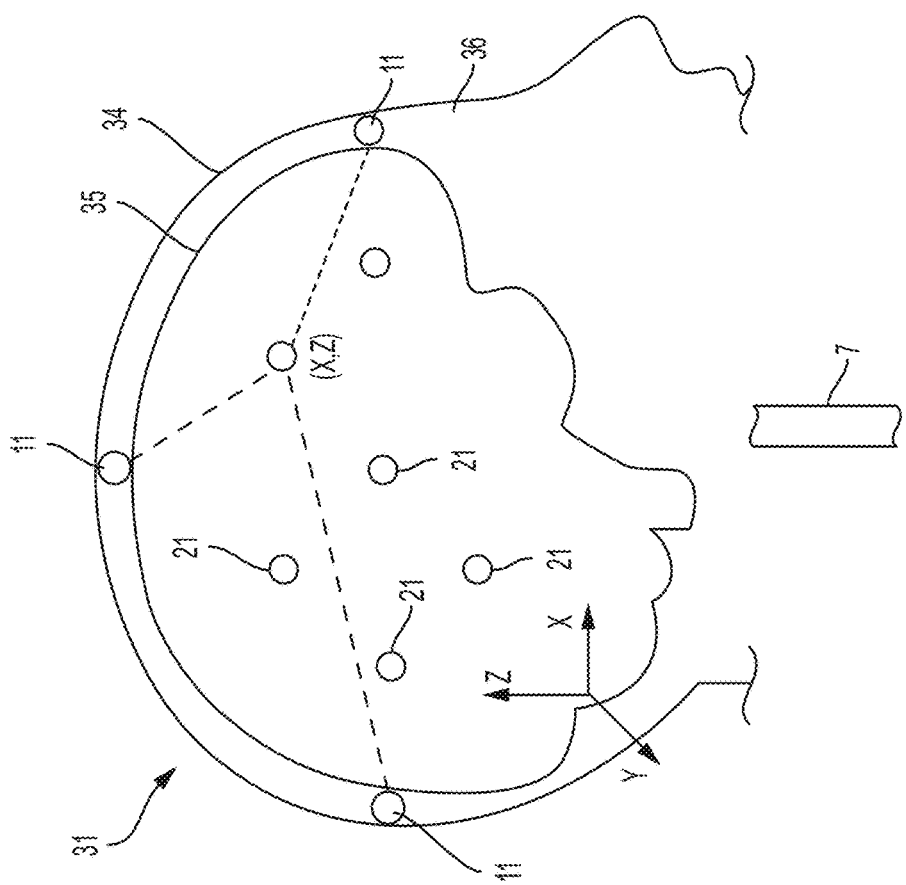
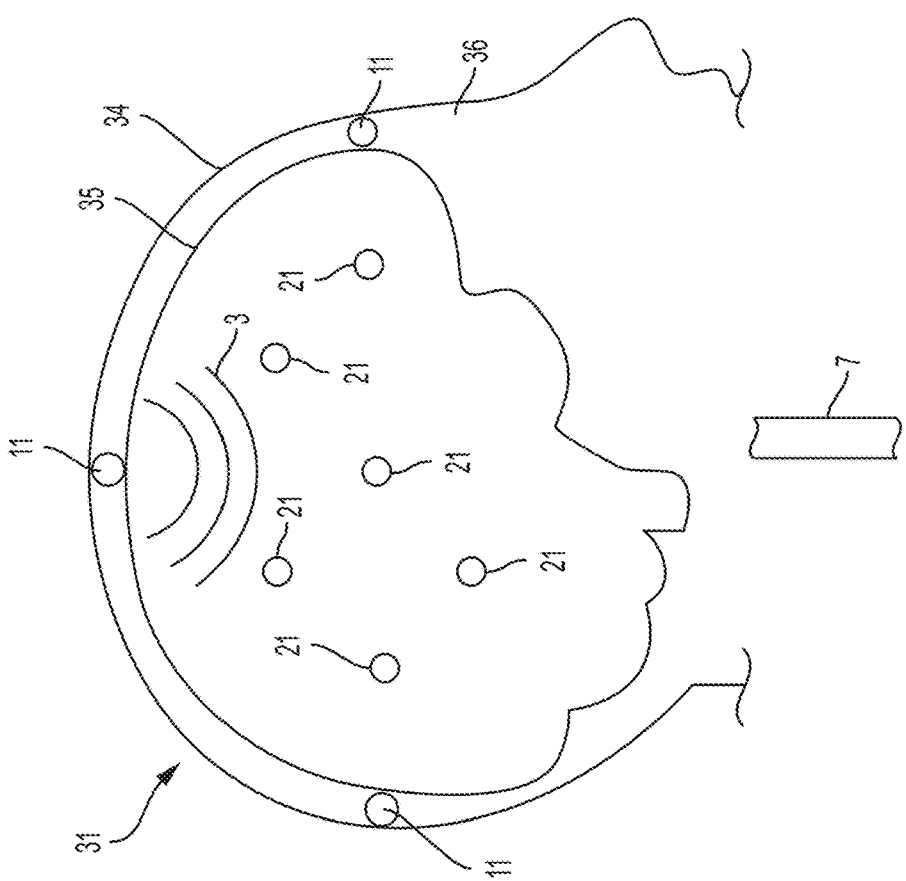

SYSTEM, METHOD AND COMPUTER READABLE MEDIUM FOR QUANTIFYING ANATOMICAL DEVICE DEFORMATION UNDER LOAD

RELATED APPLICATIONS

The present application claims benefit of priority under 35 U.S.C § 119 (e) from U.S. Provisional Application Ser. No. 62/450,118, filed Jan. 25, 2017, entitled "System and Method for Brain Deformation Headform Using Sonomicrometry" and U.S. Provisional Application Ser. No. 62/620,166, filed Jan. 22, 2018, entitled "System and Method for Brain Deformation Headform Using Sonomicrometry"; the disclosures of which are hereby incorporated by reference herein in their entirety.

STATEMENT OF GOVERNMENT INTEREST

This invention was made with government support under Grant No. DTNH2215D00022-0002, awarded by the U.S. Department of Transportation. The government has certain rights in the invention.

FIELD OF INVENTION

The present disclosure relates generally to quantifying anatomical device deformation under load. More particularly, assessing the risk, damage, and injury associated with an anthropomorphic test device (ATD) in response to an intrinsic load or extrinsic load.

BACKGROUND

Traumatic Brain Injury (TBI) presents an urgent public health concern. The Center for Disease Control reports that the annual incidence of TBI amongst civilians in the United States is approximately 1.7 million, of which 53,000 are fatal. The present inventor submits that current dummies that are used in brain injury prevention efforts are limited in that they use gross head kinematic measures (acceleration and angular velocity) to try to predict injury risk. The present inventors further submit that those measures, however, are only loosely related to brain injury risk, whereas the association is often dependent on the context and specific characteristics of the exposure.

There is need for a more consistent and accurate simulation of a brain (or other anatomical regions) subjected to deformation or movement. There is a need for an improved method and system for assessing brain injury (or other anatomical regions related injury).

SUMMARY OF EXEMPLARY EMBODIMENTS OF THE INVENTION

Previously, human brain deformation has been studied through the use of neutrally dense, radiopaque targets implanted in the brain tissue of cadaveric specimens and their 3D motion tracked using bi-planar X-ray during head impact. Although these experiments provide insight on how the brain deforms, they include several limitations associated with line-of-sight constraints. An aspect of an embodiment of the present invention includes, among other things, methodology and system to quantify 3D whole brain deformation in situ settings and anthropomorphic settings for multi-directional dynamic head rotation. Such a method and system will provide a framework for acquiring accurate and repeatable brain deformation data using trilateration, triangulation, or sonomicrometry that can be used to generate biofidelity targets for finite element (FE) model development, validation, and improvement. An aspect of an embodiment of the present invention will improve the ability to validate models for injury prediction using comprehensive experimental data with well-defined boundary conditions.

An aspect of an embodiment of the present invention method and system comprises, but not limited thereto, ability to provide for the quantification of In Situ (and anthropomorphic settings) whole brain deformation under rotational impact using sonomicrometry trilateration, triangulation or other geometric or tracking algorithms.

An aspect of an embodiment of the present invention provides a system that may include, but not limited thereto, a headform (e.g., dummy head) that may be used to assess brain injury risk based on measuring deformation in a simulated brain. An aspect of an embodiment of the present invention provides a system and method that has an advantage over previous dummy heads, for example, in that deformation of a simulated brain is likely to be more consistently and causally related to brain injury risk than the gross kinematic measures that have been used previously.

An aspect of an embodiment of the present invention provides, but not limited thereto, a system, comprising: an anthropomorphic test device (ATD); an acoustic transmitter device located on a first region of the ATD; an acoustic receiver device located on a second region of the ATD; power circuit configured to provide an electric field in communication with the acoustic transmitter to activate the acoustic transmitter to generate mechanical waves to be received by the acoustic receiver; a location determination circuit comprising a memory circuit and processor circuit, the memory circuit comprising instructions that when executed by the processor circuit, cause the location determination circuit to determine relative locations of the acoustic transmitter device and the acoustic receiver device by the time of flight of the generated mechanical wave traveling from the acoustic transmitter device to the acoustic receiver device while the first region of the ATD and/or the second region of the ATD are subjected to movement and/or deformation; and the memory circuit comprising instructions that when executed by the processor circuit, the movement of the second region of the ATD is determined that provides movement and/or deformation data of the second region of the ATD.

An aspect of an embodiment of the present invention provides, but not limited thereto, an automated method of determining movement and/or deformation of an anthropomorphic test device (ATD). The method may comprise: supplying an acoustic transmitter device located on a first region of the ATD; supplying an acoustic receiver device located on a second region of the ATD; providing an electric field in communication with the acoustic transmitter to activate the acoustic transmitter for generating mechanical waves to be received by the acoustic receiver; determining relative locations of the acoustic transmitter device and the acoustic receiver device by the time of flight of the generated mechanical wave traveling from the acoustic transmitter device to the acoustic receiver device while the first region of the ATD and/or the second region of the ATD are subjected to movement and/or deformation; and determining movement and/or deformation data of the second region of the ATD, and transmitting information representing the movement and/or deformation data of the second region, or presenting the information representing the movement and/or deformation data of the second region on a display.

An aspect of an embodiment of the present invention provides, but not limited thereto, a non-transitory computer readable medium having computer program logic that when implemented enables one or more processors to determine movement and/or deformation of an anthropomorphic test device (ATD). The computer program logic may comprise: determining relative locations of an acoustic transmitter device and an acoustic receiver device by the time of flight based on data received by a generated mechanical wave traveling from the acoustic transmitter device to the acoustic receiver device while the first region of the ATD and/or the second region of the ATD are subjected to movement and/or deformation; and determining movement and/or deformation data of the second region of the ATD, and transmitting information representing the movement and/or deformation data of the second region, or presenting the information representing the movement and/or deformation data of the second region on a display.

An aspect of an embodiment of the present invention provides, but not limited thereto, a non-transitory machine readable medium including instructions for determining movement and/or deformation of an anthropomorphic test device (ATD), which when executed by a machine, cause the machine to: determine relative locations of an acoustic transmitter device and an acoustic receiver device by the time of flight based on data received by a generated mechanical wave traveling from the acoustic transmitter device to the acoustic receiver device while the first region of the ATD and/or the second region of the ATD are subjected to movement and/or deformation; and determine movement and/or deformation data of the second region of the ATD, and transmit information representing the movement and/or deformation data of the second region, or present the information representing the movement and/or deformation data of the second region on a display.

It should be appreciated that any of the components or modules referred to with regards to any of the present invention embodiments discussed herein, may be integrally or separately formed with one another. Further, redundant functions or structures of the components or modules may be implemented. Moreover, the various components may be communicated locally and/or remotely with any user/clinician/patient or machine/system/computer/processor. Moreover, the various components may be in communication via wireless and/or hardwire or other desirable and available communication means, systems and hardware. Moreover, various components and modules may be substituted with other modules or components that provide similar functions.

It should be appreciated that the device and related components discussed herein may take on all shapes along the entire continual geometric spectrum of manipulation of x, y and z planes to provide and meet the anatomical, environmental, and structural demands and operational requirements. Moreover, locations and alignments of the various components may vary as desired or required.

It should be appreciated that various sizes, dimensions, contours, rigidity, shapes, flexibility and materials of any of the components or portions of components in the various embodiments discussed throughout may be varied and utilized as desired or required.

It should be appreciated that while some dimensions are provided on the aforementioned figures, the device may constitute various sizes, dimensions, contours, rigidity, shapes, flexibility and materials as it pertains to the components or portions of components of the device, and therefore may be varied and utilized as desired or required.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

As discussed herein, a "subject" may be any applicable human, animal, or other organism, living or dead, or other biological or molecular structure or chemical environment, and may relate to particular components of the subject, for instance specific tissues or fluids of a subject (e.g., human tissue in a particular area of the body of a living subject), which may be in a particular location of the subject, referred to herein as an "area of interest" or a "region of interest."

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the $n^{th}$ reference in the list. All references cited and discussed in this specification are incorporated herein by reference in their entireties and to the same extent as if each reference was individually incorporated by reference.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g. 1 to 5 includes 1, 1.5, 2, 2.75, 3, 3.90, 4, 4.24, and 5). Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The invention itself, together with further objects and attendant advantages, will best be understood by reference to the following detailed description, taken in conjunction with the accompanying drawings.

These and other objects, along with advantages and features of various aspects of embodiments of the invention disclosed herein, will be made more apparent from the description, drawings and claims that follow.

BRIEF DESCRIPTION OF THE DRAWINGS

The foregoing and other objects, features and advantages of the present invention, as well as the invention itself, will be more fully understood from the following description of preferred embodiments, when read together with the accompanying drawings.

The accompanying drawings, which are incorporated into and form a part of the instant specification, illustrate several aspects and embodiments of the present invention and, together with the description herein, serve to explain the principles of the invention. The drawings are provided only for the purpose of illustrating select embodiments of the invention and are not to be construed as limiting the invention.

FIG. 4 schematically illustrates a system that includes an anthropomorphic test device (ATD) showing another mechanical wave (such as an ultrasound wave) emitted from another given transmitter.

FIG. 5 schematically illustrates a system that includes an anthropomorphic test device (ATD) showing geometrical relationship between the various transmitters and receivers.

DETAILED DESCRIPTION OF EXEMPLARY EMBODIMENTS

Figure 1:
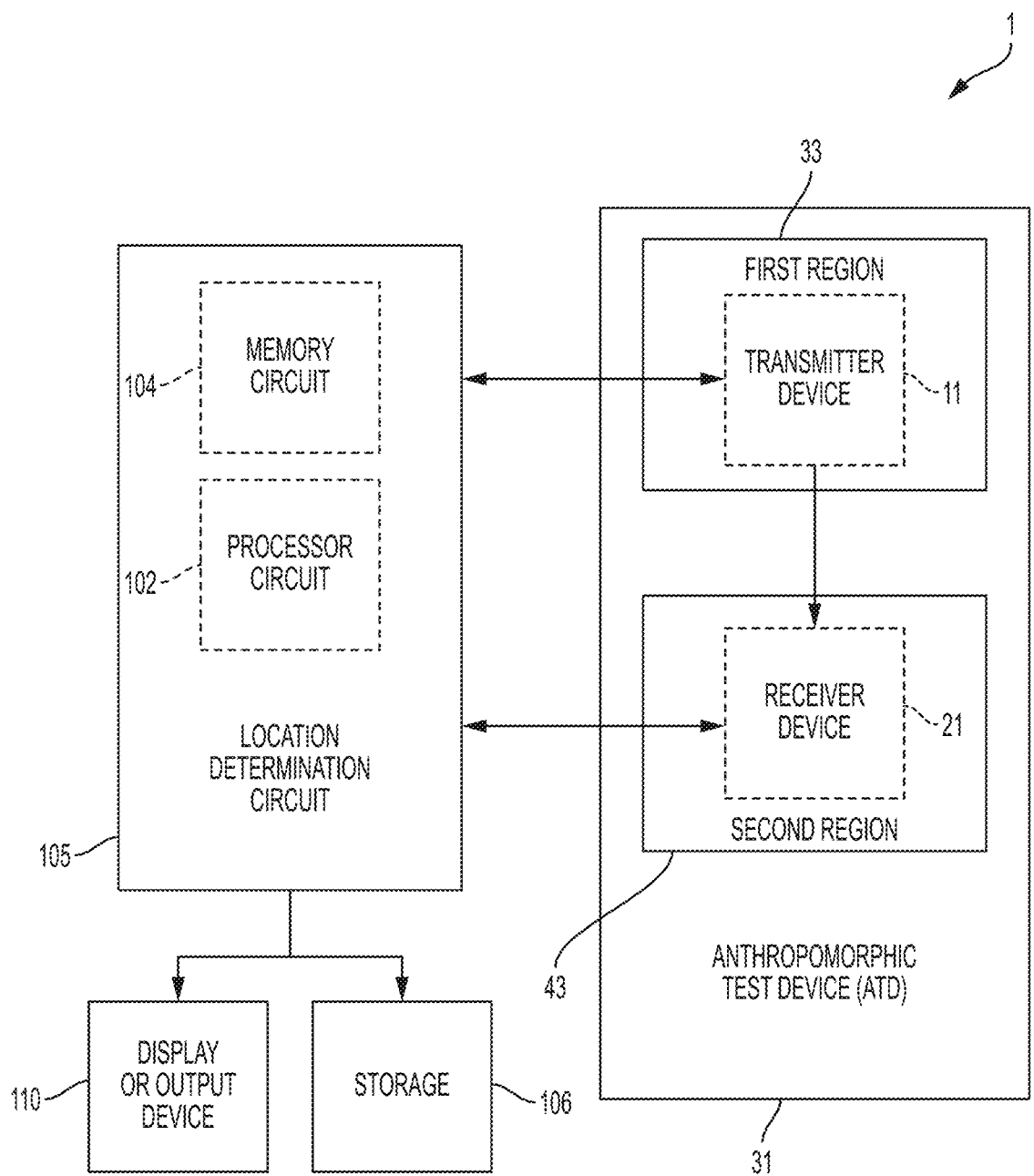
FIG. 1 schematically illustrates as system that can include an anthropomorphic test device (ATD), transmitter device, receiver device, and a localization determination circuit.

FIG. 1 schematically illustrates a system 1 that can include an anthropomorphic test device (ATD) 31 with a first region of the ATD 33 and second region of the ATD 43, transmitter device 11, receiver device 21, and a localization determination circuit 105, which may be in communication with a display or output device 110 or storage 106.

Referring generally to FIGS. 2-5, FIG. 2 schematically illustrates a system that may include an anthropomorphic test device (ATD) 31 generally reflecting a head 36. Also shown is a mount 7 that may be used for mounting or connecting the ATD 31 and head 36 to a dummy or test device, track, system or equipment (not shown).

Figure 3:
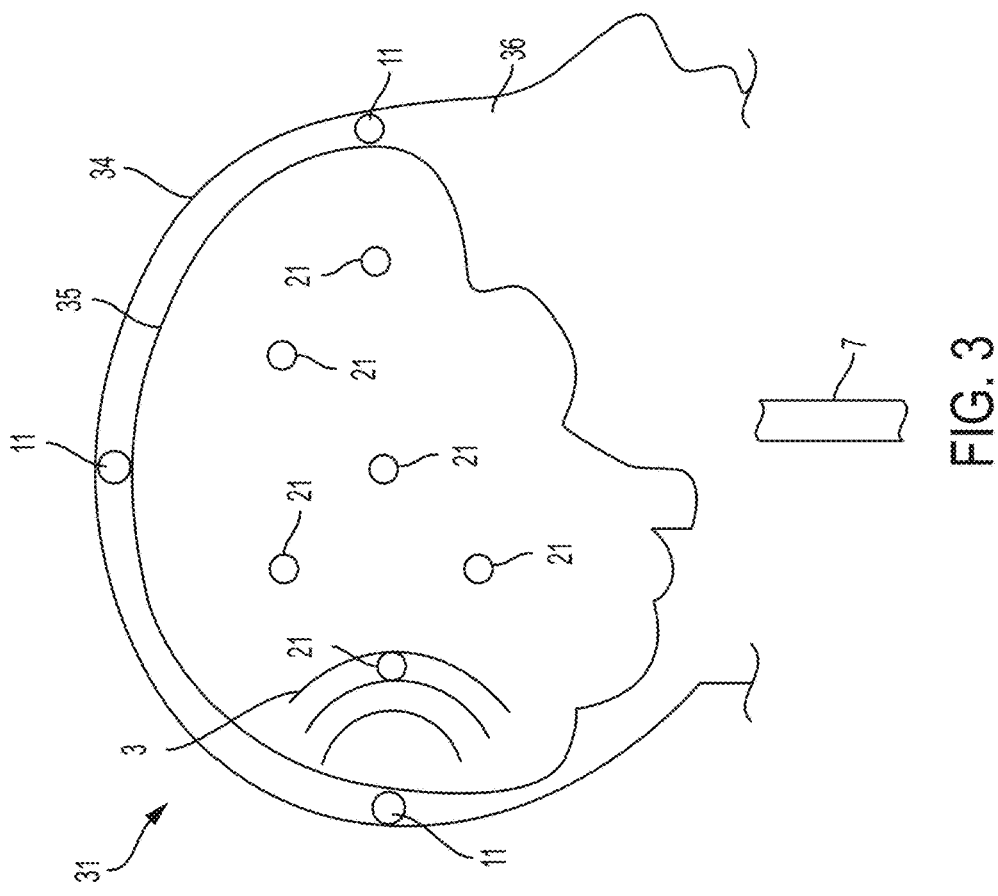
FIG. 3 schematically illustrates a system that includes an anthropomorphic test device (ATD) showing a mechanical wave (such as an ultrasound wave) emitted from a given transmitter.
Figure 2:
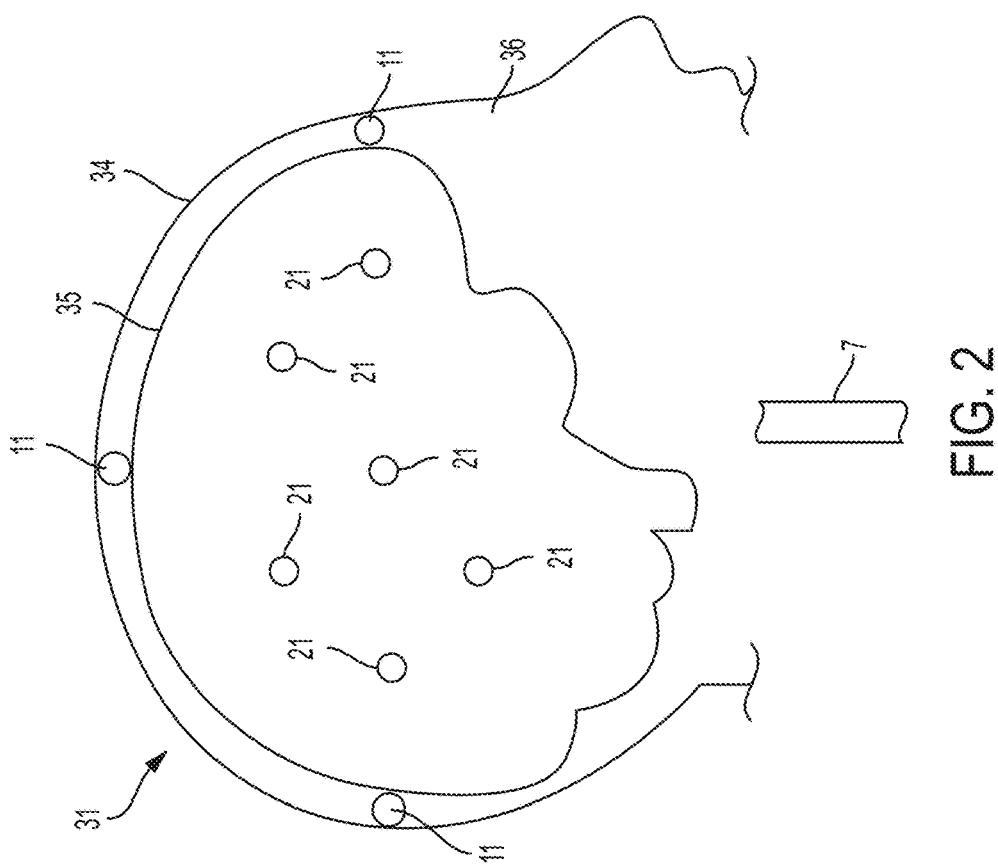
FIG. 2 schematically illustrates a system that includes an anthropomorphic test device (ATD).
Figure 6:
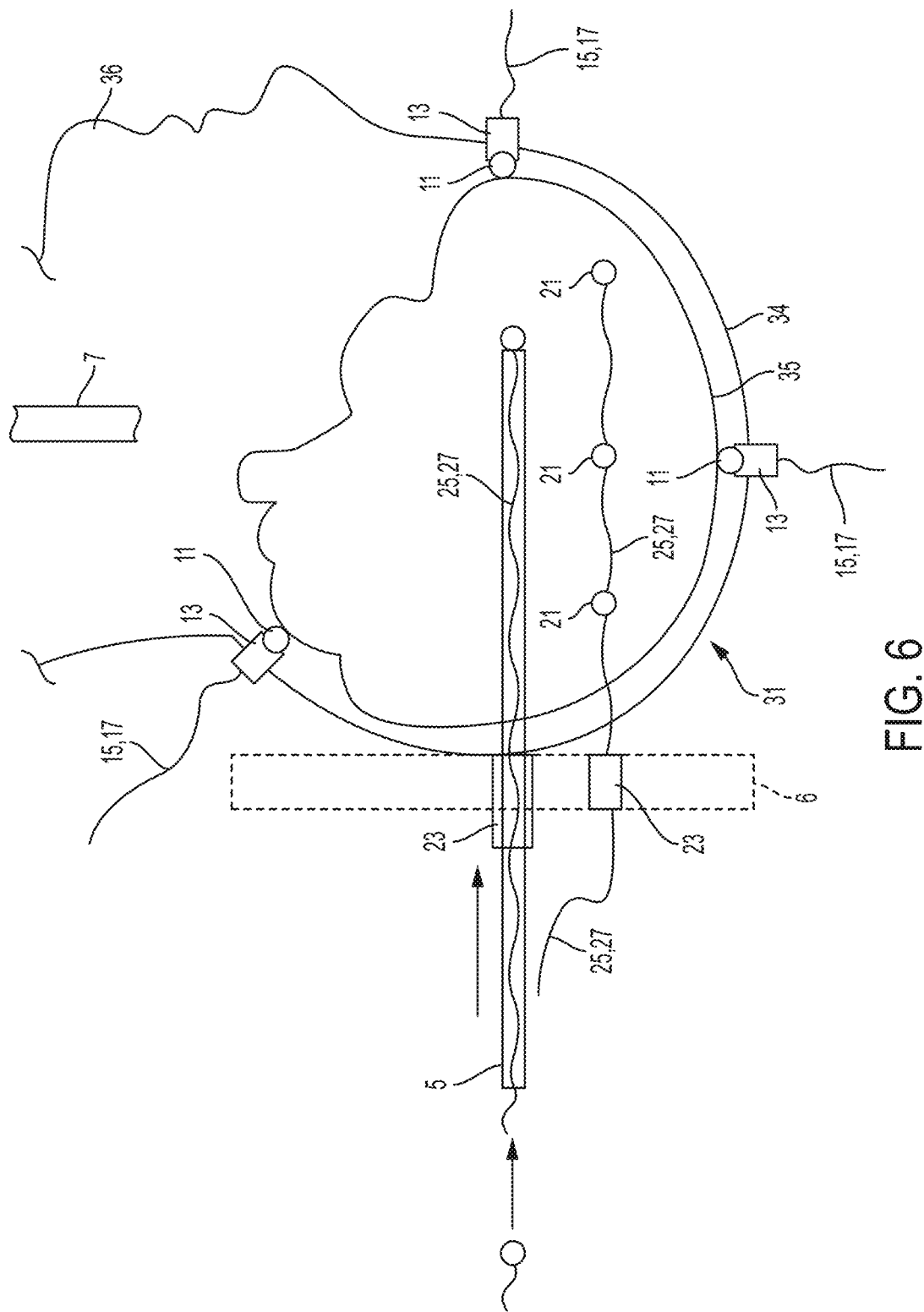
FIG. 6 schematically illustrates a system used in an in situ investigation depicting a setup for a crystal receiver device insertion procedure whereby a cannula is inserted to the required depth and the receiver is pushed down the length of the cannula into the brain.

FIG. 3 schematically illustrates a system that includes an anthropomorphic test device (ATD) 31 showing a mechanical wave 3 (such as an ultrasound wave) emitted from a given transmitter 11 received by a receiver 21.

FIG. 4 schematically illustrates a system that includes an anthropomorphic test device (ATD) 31 showing another mechanical wave 3 (such as an ultrasound wave) emitted from another given transmitter 11 received by a receiver 21.

FIG. 5 schematically illustrates a system that includes an anthropomorphic test device (ATD) 31 generally showing geometrical relationship between the various transmitters 11 disposed on the skull 34 and receivers 21 disposed within the brain 35.

For example, in an embodiment, sonomicrometry, triangulation or trilateration (or other geometric technique) may be used to track the 3D position of locations within the brain of the headform relative to the skull. A set of sonomicrometry crystals may be fixed to points on the interior surface of the simulated skull, and a set of sonomicrometry crystals may be placed within the simulated brain. The "skull" crystals primarily act as transmitters, and the "brain" crystals act as receivers. An ultrasound wave (or other mechanical wave or type of communication) may be emitted from a given transmitter, and is received by all other crystals. This gives the distances from the transmitting "skull" crystal to all other "brain" crystals. The next transmitting crystal emits a pulse that is received by all other crystals, giving the distances from that transmitter to all other crystals. This process is then repeated for all transmitting crystals. After determining the distance of each receiving crystal from each skull crystal, trilateration may be used to determine the position of the receiving crystal in the skull reference frame. This entire process is then repeated to track crystal movement and brain deformation in time.

Figure 10:
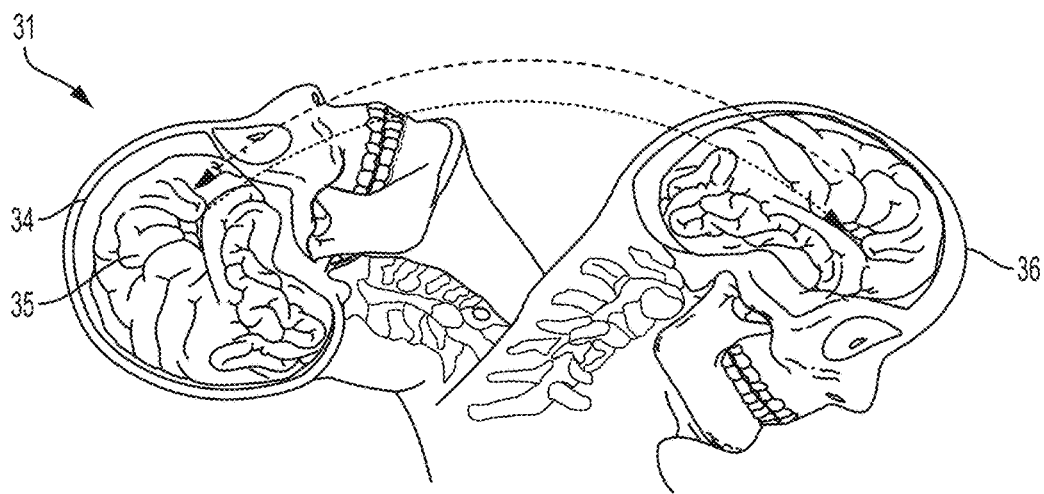
FIG. 10 schematically illustrates a lateral view (side view) of an anthropomorphic test device (ATD) having a skull and brain components incurring a rotation pulse in the sagittal rotation direction.

FIG. 10 schematically illustrates a lateral view (side view) of an embodiment of an anthropomorphic test device (ATD) having a skull and brain components incurring a rotation pulse in the sagittal rotation direction.

Figure 11:
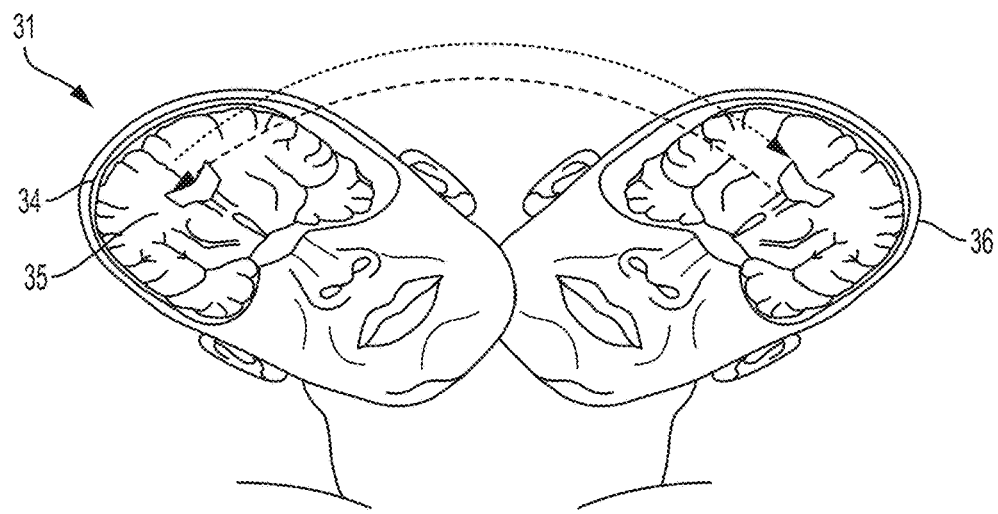
FIG. 11 schematically illustrates an anterior view (front view) of an anthropomorphic test device (ATD) having a skull and brain components incurring a rotation pulse in the coronal rotation direction.

FIG. 11 schematically illustrates an anterior view (front view) of an embodiment of an anthropomorphic test device (ATD) having a skull and brain components incurring a rotation pulse in the coronal rotation direction.

Figure 12:
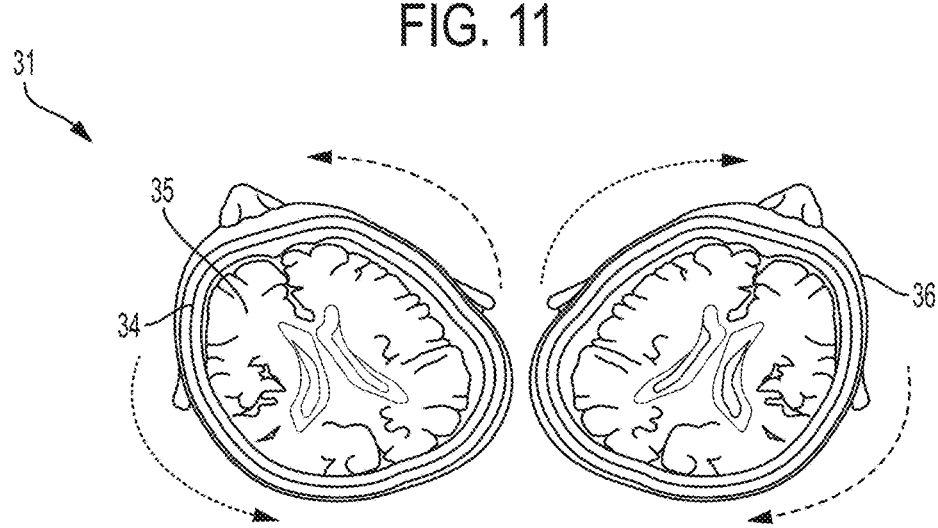
FIG. 12 schematically illustrates a superior view (top view) of an anthropomorphic test device (ATD) having a skull and brain components incurring a rotation pulse in the axial rotation direction.

FIG. 12 schematically illustrates a superior view (top view) of an embodiment of an anthropomorphic test device (ATD) having a skull and brain components incurring a rotation pulse in the axial rotation direction.

Figure 13:
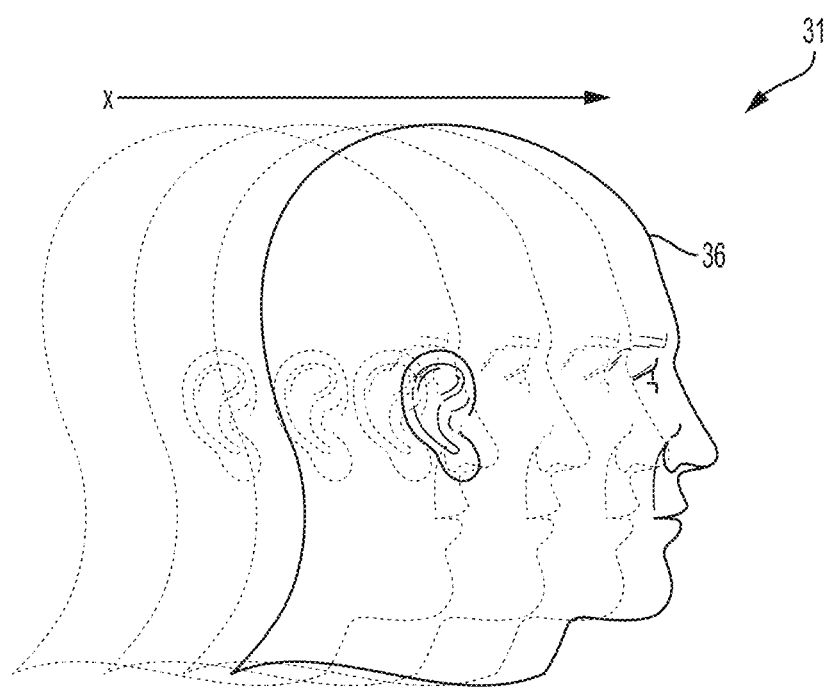
FIG. 13 schematically illustrates a lateral view (side view) of an anthropomorphic test device (ATD) having a skull and brain components incurring a pulse in the sagittal linear direction (e.g., x-axis).

FIG. 13 schematically illustrates a lateral view (side view) of an embodiment of an anthropomorphic test device (ATD) having a skull and brain components incurring a pulse in the sagittal linear direction (e.g., x-axis).

Figure 14:
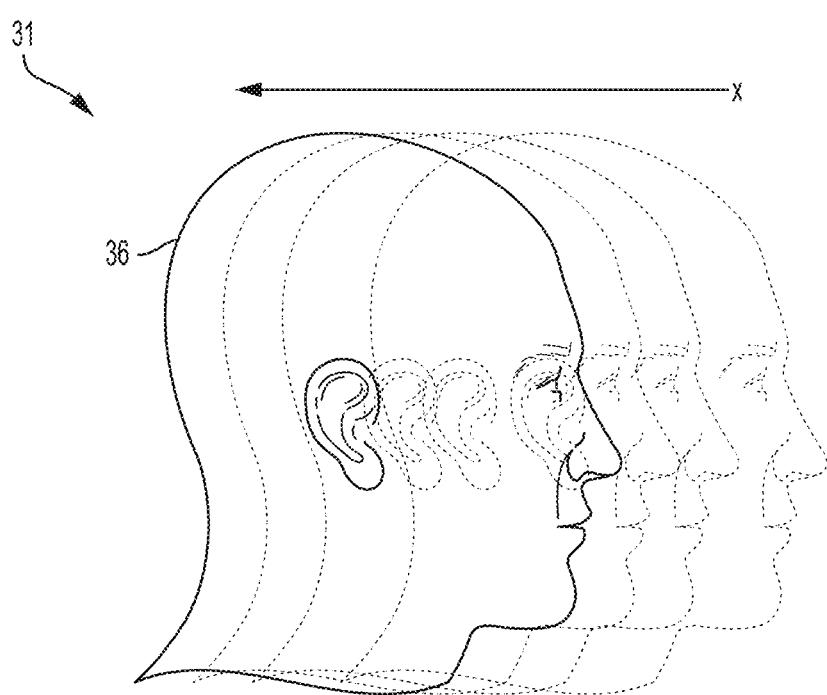
FIG. 14 schematically illustrates a lateral view (side view) of an anthropomorphic test device (ATD) having a skull and brain components incurring a pulse in the sagittal linear direction (e.g., x-axis).

FIG. 14 schematically illustrates a lateral view (side view) of an embodiment of an anthropomorphic test device (ATD) having a skull and brain components incurring a pulse in the sagittal linear direction (e.g., x-axis).

Figure 15:
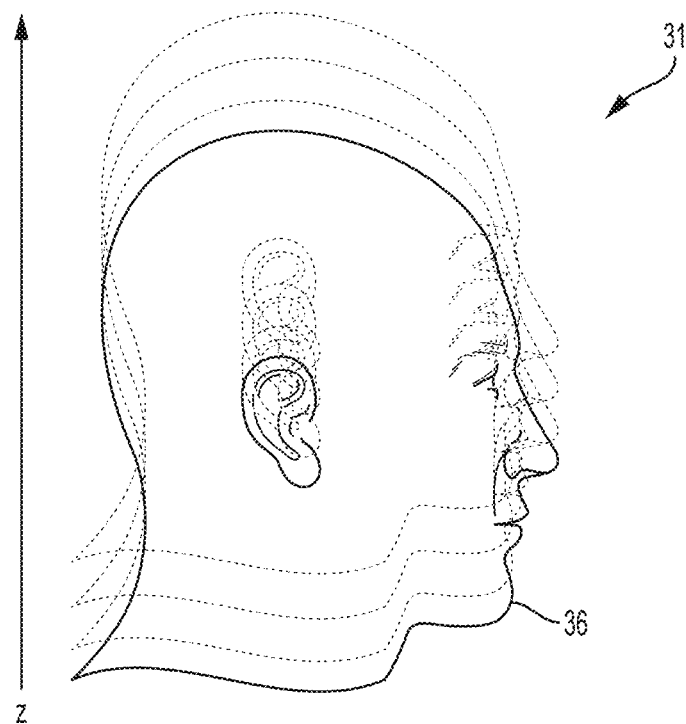
FIG. 15 schematically illustrates a lateral view (side view) of an anthropomorphic test device (ATD) having a skull and brain components incurring a pulse in the axial linear direction (e.g., z-axis).

FIG. 15 schematically illustrates a lateral view (side view) of an embodiment of an anthropomorphic test device (ATD) having a skull and brain components incurring a pulse in the axial linear direction (e.g., z-axis).

Figure 16:
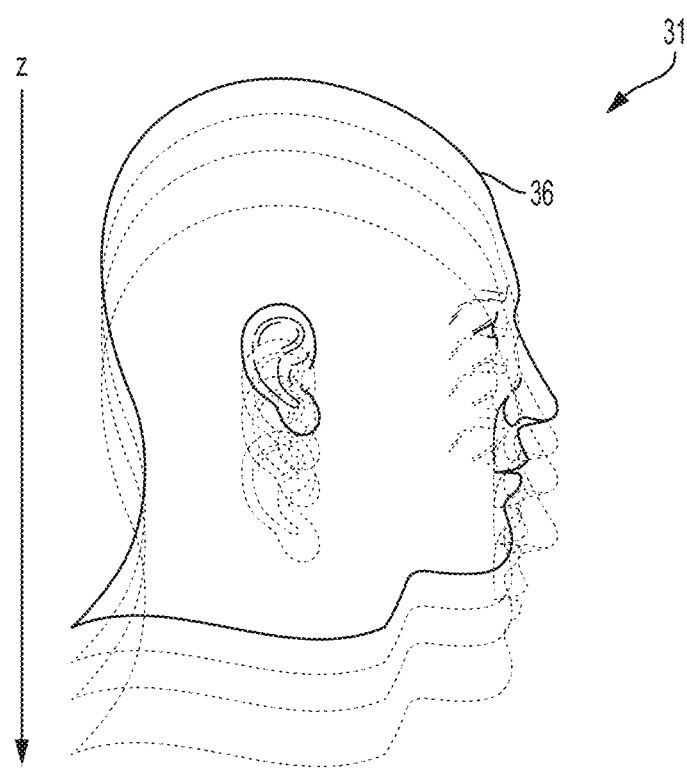
FIG. 16 schematically illustrates a lateral view (side view) of an anthropomorphic test device (ATD) having a skull and brain components incurring a pulse in the axial linear direction (e.g., z-axis).

FIG. 16 schematically illustrates a lateral view (side view) of an embodiment of an anthropomorphic test device (ATD) having a skull and brain components incurring a pulse in the axial linear direction (e.g., z-axis).

Figure 28:
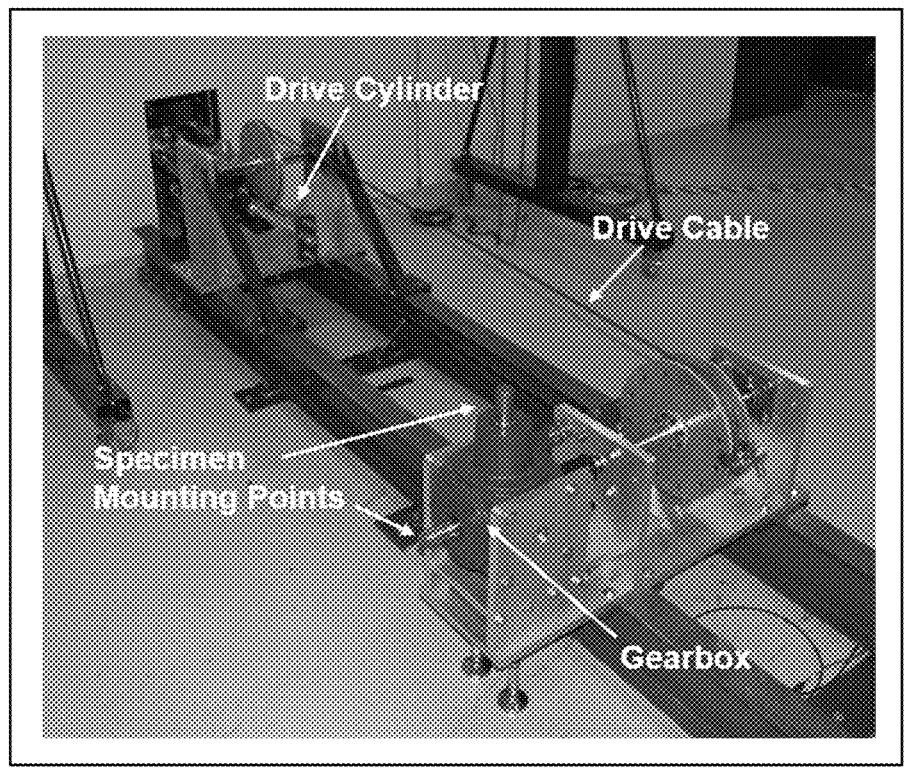
FIG. 28 is a screenshot showing a rotational test device (RTD) configured to receive and operate with an embodiment of the ATD head.

FIG. 28 is a screenshot showing a rotational test device (RTD) configured to receive and operate with an embodiment of the ATD head.

Figure 29:
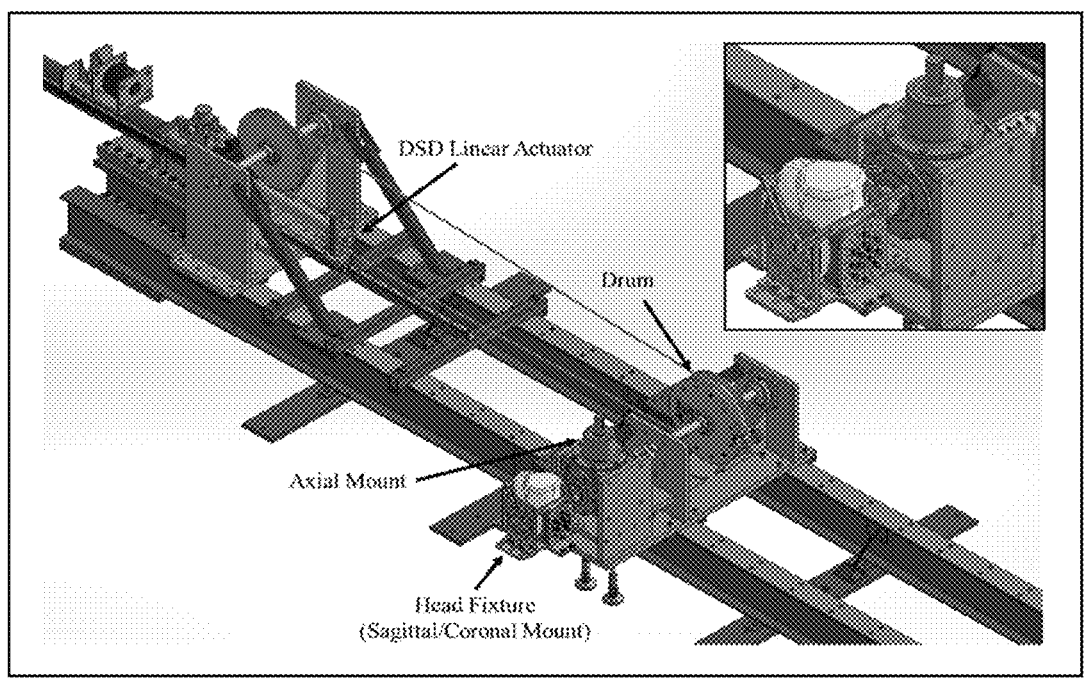
FIG. 29 is a screenshot showing a rotational test device (RTD) configured to receive and operate with an embodiment of the ATD head.

FIG. 29 is a screenshot showing a rotational test device (RTD) configured to receive and operate with an embodiment of the ATD head.

Figure 30:
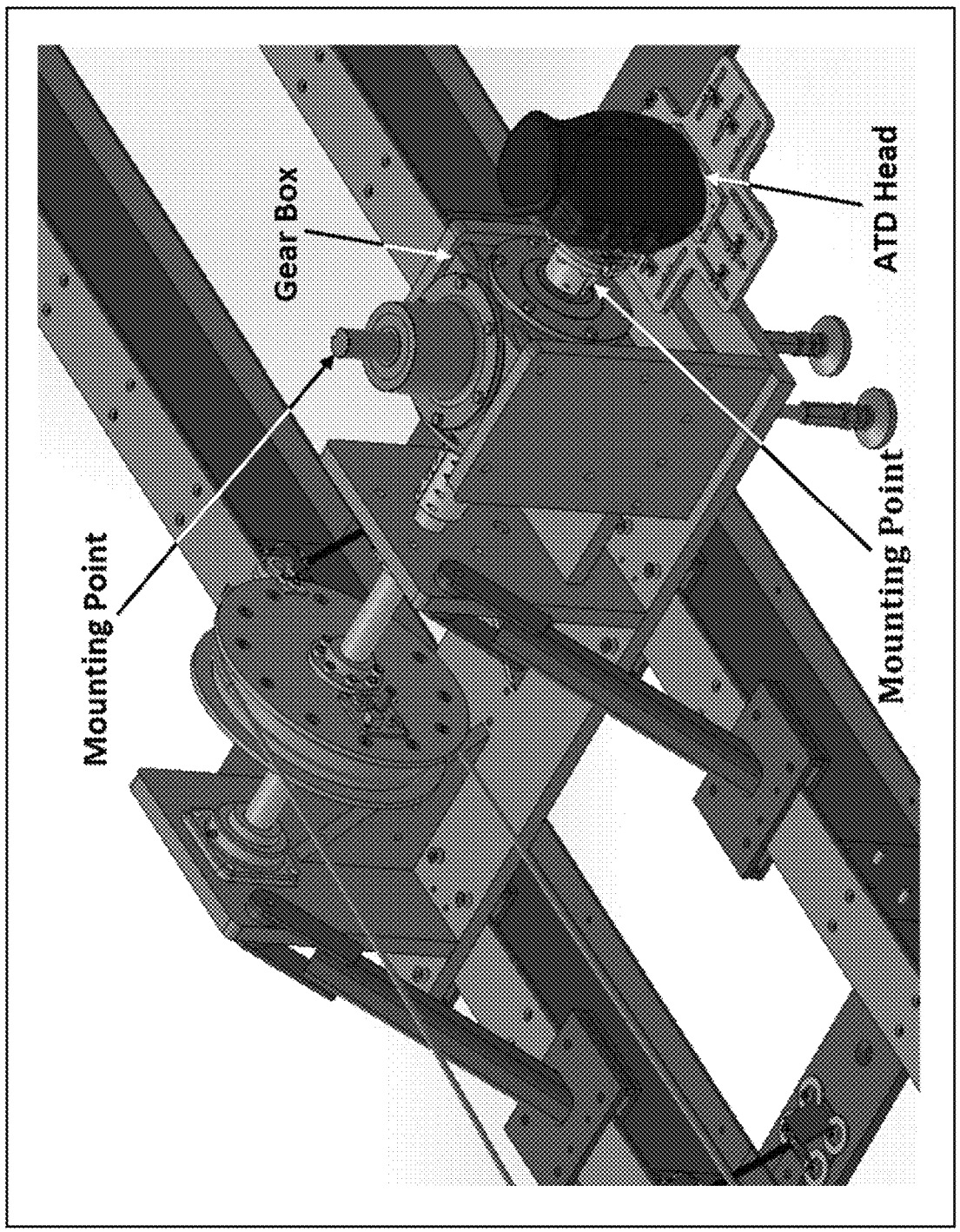
FIG. 30 is a screenshot showing a rotational test device (RTD) with an ATD head mounted thereto for a sagittal type test. The RTD is configured to receive and operate with an embodiment of the ATD head.

FIG. 30 is a screenshot showing a rotational test device (RTD) with an ATD head mounted thereto for a sagittal type test. The RTD is configured to receive and operate with an embodiment of the ATD head.

Figure 31:
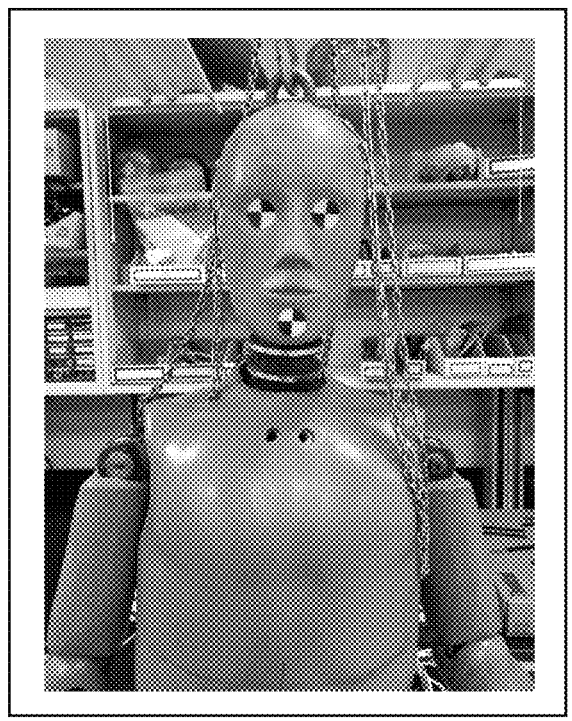
FIG. 31 is a screenshot showing a test dummy torso and head.

FIG. 31 is a screenshot showing a test dummy torso and head.

Figure 32:
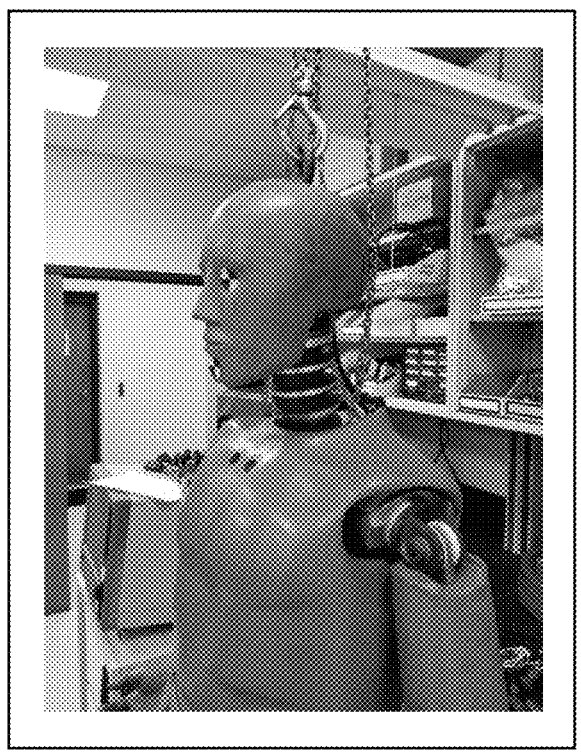
FIG. 32 is a screenshot showing a test dummy torso and head.

FIG. 32 is a screenshot showing a test dummy torso and head.

Figure 33:
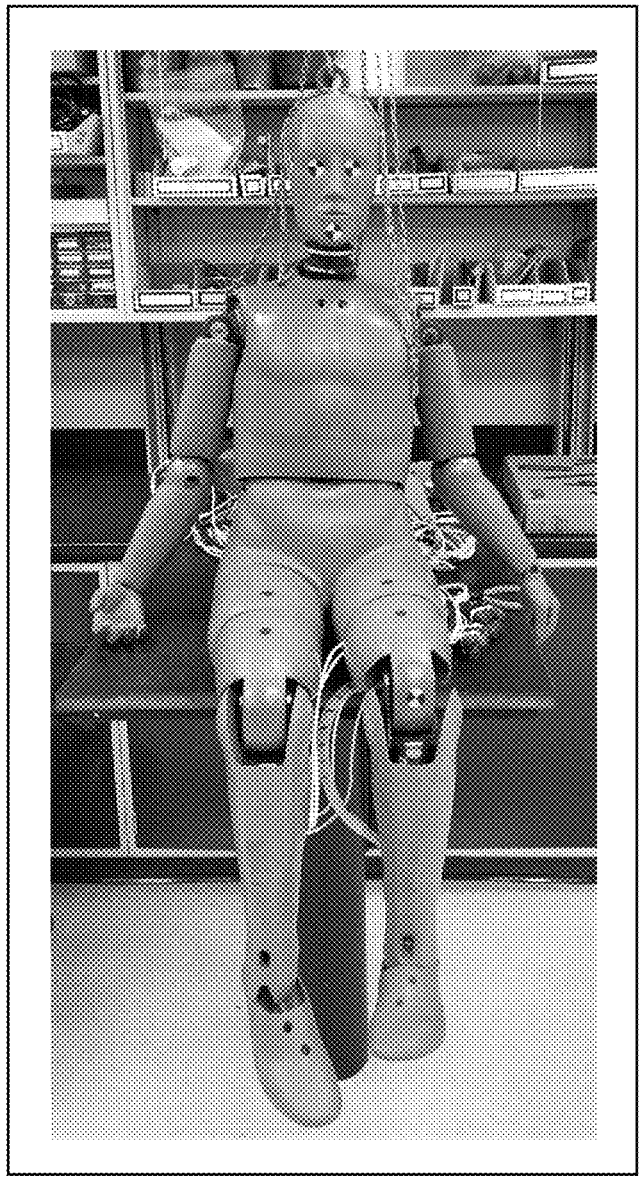
FIG. 33 is a screenshot showing a test dummy full body and head.

FIG. 33 is a screenshot showing a test dummy full body and head.

Figure 34:
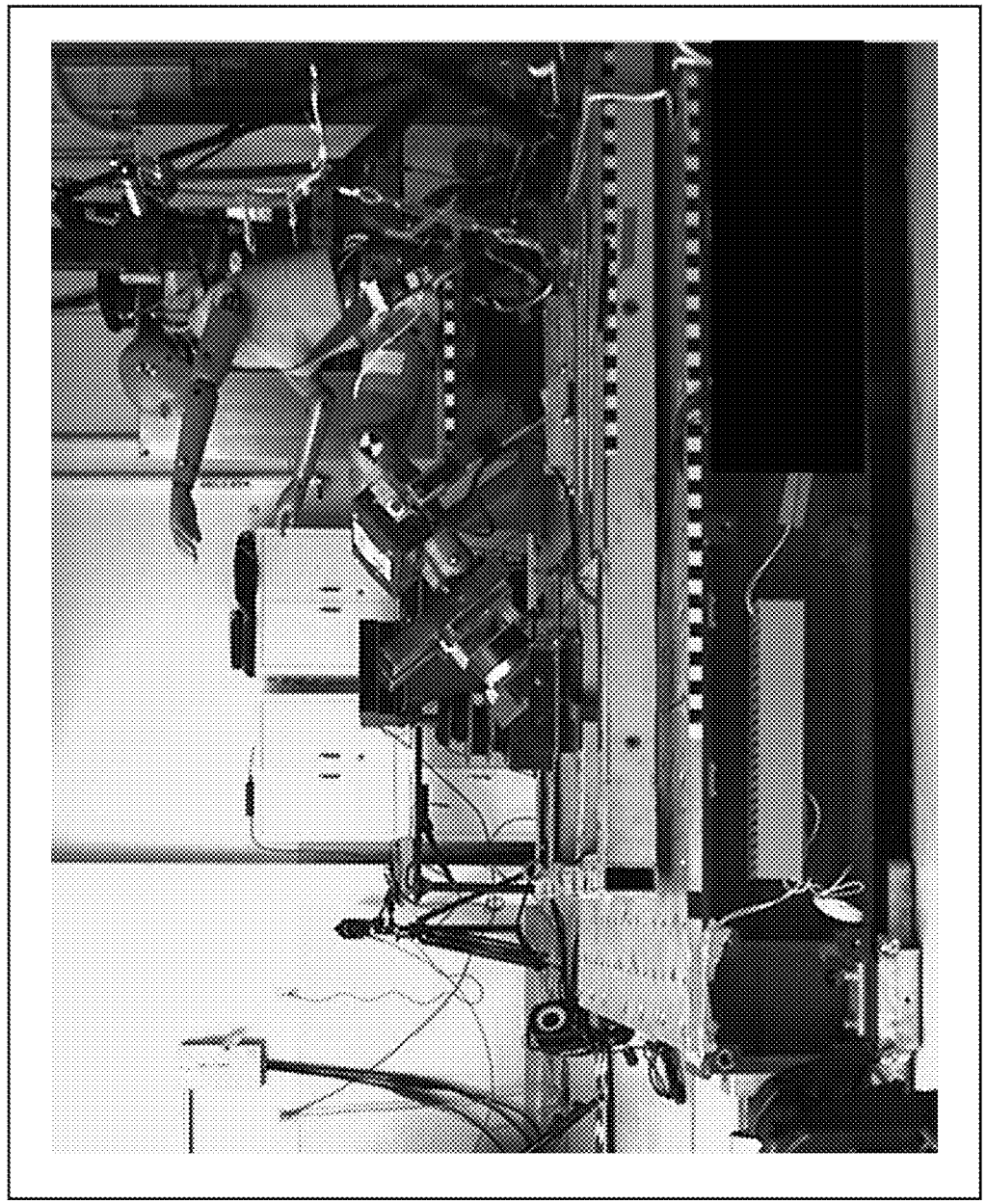
FIG. 34 is a screenshot showing a test dummy mounted to a crash test track while being effected by a collision during a test.

FIG. 34 is a screenshot showing a test dummy mounted to a crash test track while being effected by a collision during a test.

Figure 35:
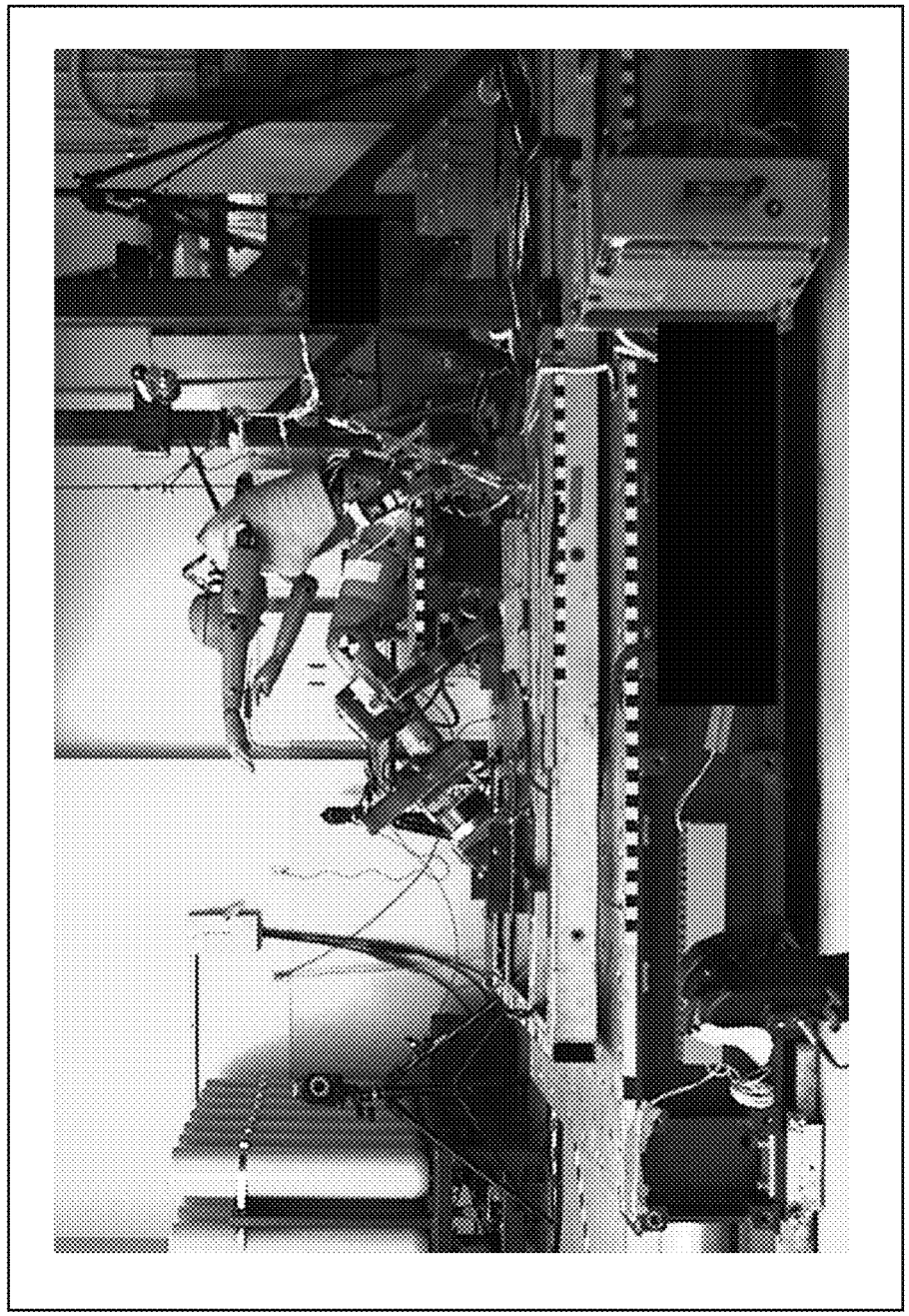
FIG. 35 is a screenshot showing a test dummy mounted to a crash test track while being effected by a collision during a test.

FIG. 35 is a screenshot showing a test dummy mounted to a crash test track while being effected by a collision during a test.

Figure 17:
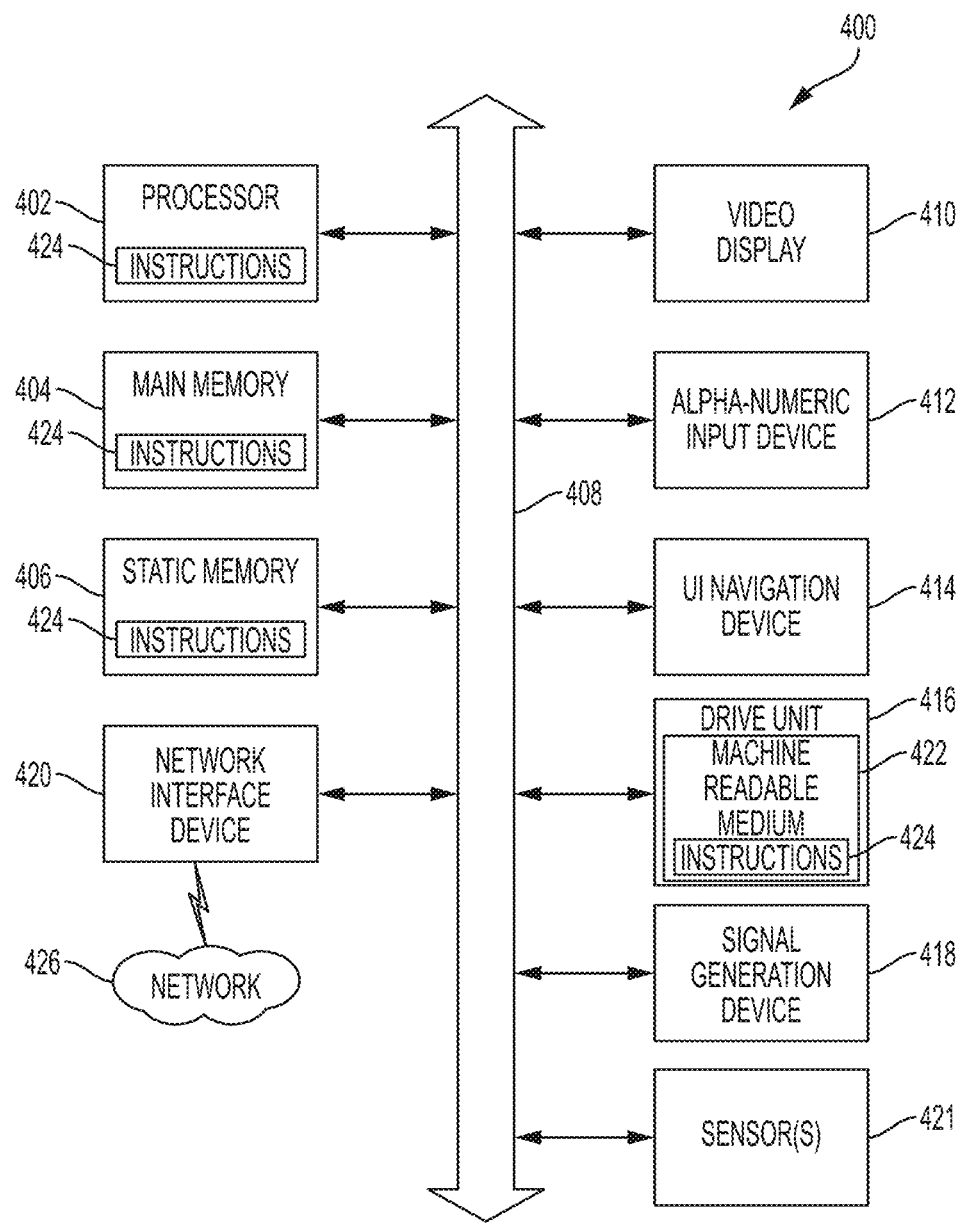
FIG. 17 schematically illustrates is a block diagram illustrating an example of a machine upon which one or more aspects of embodiments of the present invention can be implemented.
Figure 18:
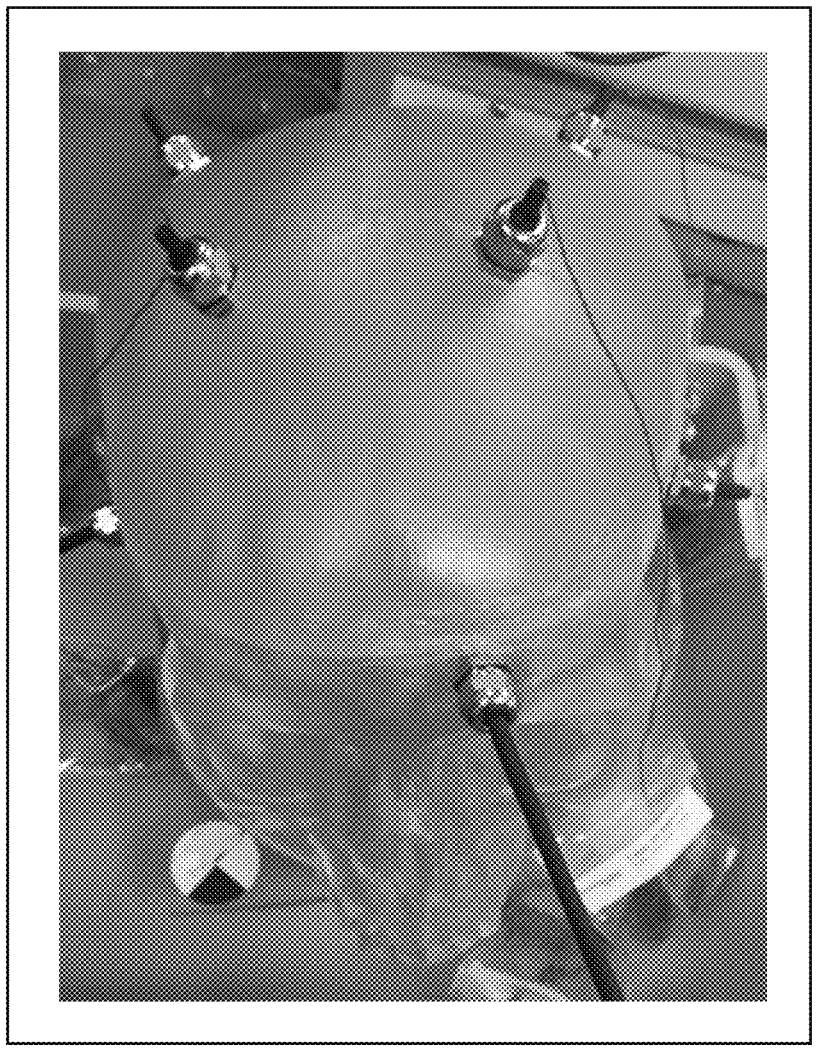
FIG. 18 is a screenshot showing a plastic skull and sonomicrometry transmitter crystals installed in an array on the inside surface of a plastic skull taken of superior aspect view of the skull (i.e., an exterior top view of skull).

FIG. 17 is a block diagram illustrating an example of a machine upon which one or more aspects of embodiments of the present invention can be implemented.

FIG. 17 illustrates a block diagram of an example machine 400 upon which one or more embodiments (e.g., discussed methodologies) can be implemented (e.g., run).

Examples of machine 400 can include logic, one or more components, circuits (e.g., modules), or mechanisms. Circuits are tangible entities configured to perform certain operations. In an example, circuits can be arranged (e.g., internally or with respect to external entities such as other circuits) in a specified manner. In an example, one or more computer systems (e.g., a standalone, client or server computer system) or one or more hardware processors (processors) can be configured by software (e.g., instructions, an application portion, or an application) as a circuit that operates to perform certain operations as described herein. In an example, the software can reside (1) on a non-transitory machine readable medium or (2) in a transmission signal. In an example, the software, when executed by the underlying hardware of the circuit, causes the circuit to perform the certain operations.

In an example, a circuit can be implemented mechanically or electronically. For example, a circuit can comprise dedicated circuitry or logic that is specifically configured to perform one or more techniques such as discussed above, such as including a special-purpose processor, a field programmable gate array (FPGA) or an application-specific integrated circuit (ASIC). In an example, a circuit can comprise programmable logic (e.g., circuitry, as encompassed within a general-purpose processor or other programmable processor) that can be temporarily configured (e.g., by software) to perform the certain operations. It will be appreciated that the decision to implement a circuit mechanically (e.g., in dedicated and permanently configured circuitry), or in temporarily configured circuitry (e.g., configured by software) can be driven by cost and time considerations.

Accordingly, the term "circuit" is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor, for example, to constitute a particular circuit at one instance of time and to constitute a different circuit at a different instance of time.

In an example, circuits can provide information to, and receive information from, other circuits. In this example, the circuits can be regarded as being communicatively coupled to one or more other circuits. Where multiple of such circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which the multiple circuits have access. For example, one circuit can perform an operation and store the output of that operation in a memory device to which it is communicatively coupled. A further circuit can then, at a later time, access the memory device to retrieve and process the stored output. In an example, circuits can be configured to initiate or receive communications with input or output devices and can operate on a resource (e.g., a collection of information).

The various operations of method examples described herein can be performed, at least partially, by one or more processors that are temporarily configured (e.g., by software) or permanently configured to perform the relevant operations. Whether temporarily or permanently configured, such processors can constitute processor-implemented circuits that operate to perform one or more operations or functions. In an example, the circuits referred to herein can comprise processor-implemented circuits.

Similarly, the methods described herein can be at least partially processor-implemented. For example, at least some of the operations of a method can be performed by one or processors or processor-implemented circuits. The performance of certain of the operations can be distributed among the one or more processors, not only residing within a single machine, but deployed across a number of machines. In an example, the processor or processors can be located in a single location (e.g., within a home environment, an office environment or as a server farm), while in other examples the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., Application Program Interfaces (APIs).)

Example embodiments (e.g., apparatus, systems, or methods) can be implemented in digital electronic circuitry, in computer hardware, in firmware, in software, or in any combination thereof. Example embodiments can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on one computer or on multiple computers at one site or distributed across multiple sites and interconnected by a communication network.

In an example, operations can be performed by one or more programmable processors executing a computer program to perform functions by operating on input data and generating output. Examples of method operations can also be performed by, and example apparatus can be implemented as, special purpose logic circuitry (e.g., a field programmable gate array (FPGA) or an application-specific integrated circuit (ASIC)).

The computing system can include clients and servers. A client and server are generally remote from each other and generally interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine 400) and software architectures that can be deployed in example embodiments.

In an example, the machine 400 can operate as a stand-alone device or the machine 400 can be connected (e.g., networked) to other machines.

In a networked deployment, the machine 400 can operate in the capacity of either a server or a client machine in server-client network environments. In an example, machine 400 can act as a peer machine in peer-to-peer (or other distributed) network environments. The machine 400 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) specifying actions to be taken (e.g., performed) by the machine 400. Further, while only a single machine 400 is illustrated, the term "machine" shall also be taken to include any collection of machines that individually or jointly execute a set (or multiple sets) of instructions to perform any one or more of the methodologies discussed herein.

Example machine (e.g., computer system) 400 can include a processor 402 (e.g., a central processing unit (CPU), a graphics processing unit (GPU) or both), a main memory 404 and a static memory 406, some or all of which can communicate with each other via a bus 408. The machine 400 can further include a display unit 410, an alphanumeric input device 412 (e.g., a keyboard), and a user interface (UI) navigation device 411 (e.g., a mouse). In an example, the display unit 410, input device 412 and UI navigation device 414 can be a touch screen display. The machine 400 can additionally include a storage device (e.g., drive unit) 416, a signal generation device 418 (e.g., a speaker), a network interface device 420, and one or more sensors 421, such as a global positioning system (GPS) sensor, compass, accelerometer, or other sensor.

The storage device 416 can include a machine readable medium 422 on which is stored one or more sets of data structures or instructions 424 (e.g., software) embodying or utilized by any one or more of the methodologies or functions described herein. The instructions 424 can also reside, completely or at least partially, within the main memory 404, within static memory 406, or within the processor 402 during execution thereof by the machine 400. In an example, one or any combination of the processor 402, the main memory 404, the static memory 406, or the storage device 416 can constitute machine readable media.

While the machine readable medium 422 is illustrated as a single medium, the term "machine readable medium" can include a single medium or multiple media (e.g., a centralized or distributed database, and/or associated caches and servers) that configured to store the one or more instructions 424. The term "machine readable medium" can also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine readable medium" can accordingly be taken to include, but not be limited to, solid-state memories, and optical and magnetic media. Specific examples of machine readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 424 can further be transmitted or received over a communications network 426 using a transmission medium via the network interface device 420 utilizing any one of a number of transfer protocols (e.g., frame relay, IP, TCP, UDP, HTTP, etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 standards family known as Wi-Fi®, IEEE 802.16 standards family known as WiMax®), peer-to-peer (P2P) networks, among others. The term "transmission medium" shall be taken to include any intangible medium that is capable of storing, encoding or carrying instructions for execution by the machine, and includes digital or analog communications signals or other intangible medium to facilitate communication of such software.

An aspect of various embodiments of the present invention may be utilized for a number of products and services, such as but not limited thereto, as discussed below and throughout this disclosure. For example, potential markets may include any field where traumatic brain injury occurs, and where injury prevention efforts include using dummies to predict injury risk and to develop protective countermeasures. Similarly, brain injury assessment may be implemented in the forensic evidence field and an applicable investigation field. Potential markets and commercialization partners may include, but not limited thereto the following: automobile safety, military, sports, occupational health and safety, medical, and forensic analysis/accident reconstruction.

The automobile safety and related field may include applications for, but not limited thereto, the following: crash test dummy manufacturers, automobile manufacturers, restraint (seatbelt and airbag) manufacturers, federal regulatory agencies (US DOT, NHTSA, etc.), consumer information agencies (e.g., Insurance Institute for Highway Safety, EuroNCAP, etc.), and crash test companies.

The military field may include applications for, but not limited thereto, the following: US DOD (USAARL, US NAVAIR, USAMRMC), defense contractors, and protective equipment manufacturers.

The sports field may include applications for, but not limited thereto, the following: collegiate and professional sports leagues (NFL, NHL, NSL, NCAA, etc.), protective equipment manufacturers, protective equipment evaluation and consumer information agencies (e.g., NOCSAE), player's agencies (e.g., NFLPA, etc.), and motorsports organizations (e.g. NASCAR, Formula 1, etc.).

The occupational health and safety field may include applications for, but not limited thereto, the following: Federal regulatory agencies (e.g. OSHA, etc.) and protective equipment manufacturers.

The forensic analysis/accident reconstruction field may include applications for, but not limited thereto, the following: forensic examiners, law enforcement organizations, and organizations specializing in determination of criminal and civil liability (Federal and State Law Enforcement; litigation and accident reconstruction professionals).

The medical field may include applications for simulating medical procedures, surgeries, diagnosis, and imaging, etc. The medical field may include applications for assisting the clinician, surgeon, medical provider, or user while in the course of conducting medical procedures, surgeries, diagnoses, and imaging, etc.

EXAMPLES

Practice of an aspect of an embodiment (or embodiments) of the invention will be still more fully understood from the following examples and experimental results, which are presented herein for illustration only and should not be construed as limiting the invention in any way.

Examples and Experimental Results Set No. 1

An aspect of an embodiment of the present invention system comprising an anthropomorphic test device (ATD) that may include, but not limited thereto, the following a) a skull made of plastic, metal, or other stiff material b) simulated deformable brain within the skull, made of gel or other soft material, and c) multiple piezoelectric crystals (or other types of detectors or sensors) placed within the brain material; wherein multiple piezoelectric crystals attached to the inner surface of the skull, in contact with the brain material. The crystals may be of a type that can emit and receive ultrasound pulses in order to measure distance between crystal transmitter-receiver pairs based on the time of flight of emitted and received pulses. An aspect of an embodiment of the present invention provides, among other things, a novel and nonobvious system that may use of sonomicrometry in an ATD with a deformable brain. An aspect of an embodiment of the present invention provides, among other things, a data acquisition electronic and computer system to collect data from the sonomicrometry crystals used in the ATD. An aspect of an embodiment of the present invention provides, among other things, the use of such a data acquisition system to collect data from an ATD with a deformable brain. An aspect of an embodiment of the present invention provides, among other things, an algorithm or model to transform data collected from the sonomicrometry crystals into deformation measurement in the brain of the headform. An aspect of an embodiment of the present invention provides, among other things, an algorithm or model to transform data collected from the sonomicrometry crystals into a predicted risk of brain injury. An aspect of an embodiment of the present invention provides, among other things, a mechanical connection device to attach the headform component or related components to a crash test dummy or other object.

Referring to FIGS. 18-22, FIG. 18 is a screenshot showing a plastic skull and sonomicrometry transmitter crystals installed in an array on the inside surface of a plastic skull taken of superior aspect view of the skull (i.e., an exterior top view of skull).

Figure 19:
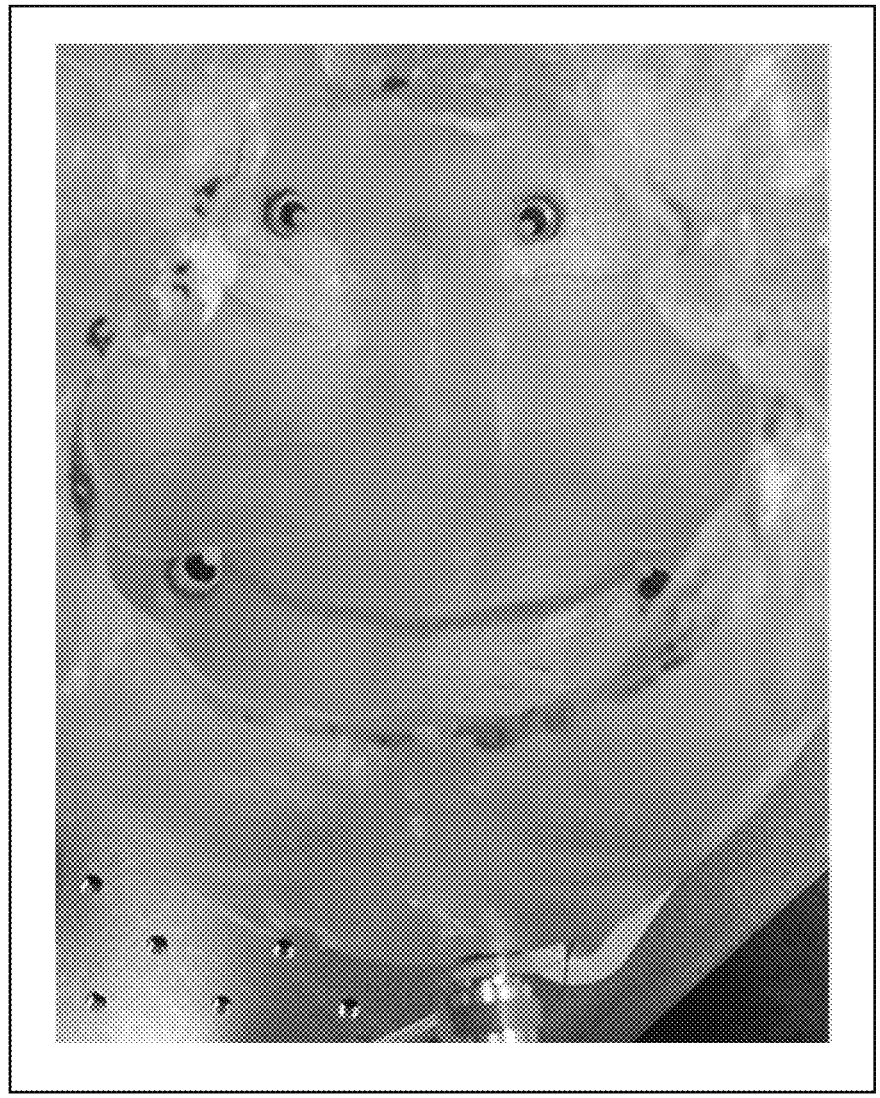
FIG. 19 is a screenshot showing a plastic skull and sonomicrometry transmitter crystals installed in an array on the inside surface of a plastic skull taken at the inferior aspect view (i.e., interior of the plastic skull).

FIG. 19 is a screenshot showing a plastic skull and sonomicrometry transmitter crystals installed in an array on the inside surface of a plastic skull taken at the inferior aspect view (i.e., interior of the plastic skull).

Figure 20:
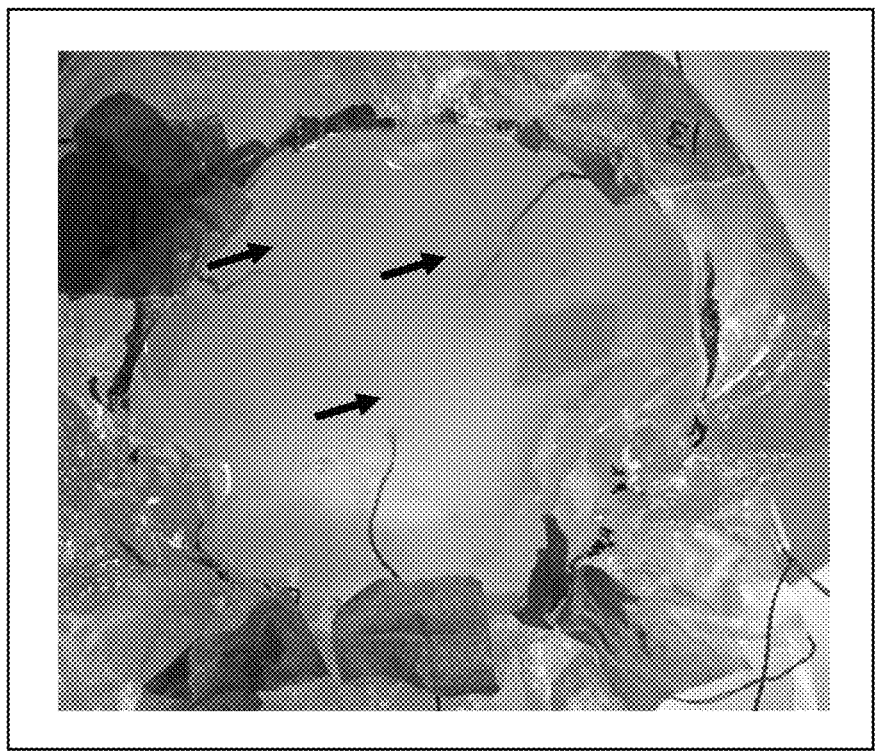
FIG. 20 is a screenshot showing sonomicrometry receiver crystals implanted in soft gel substance simulating brain material within the plastic skull taken at the inferior aspect view of the plastic skull (i.e., interior of the plastic skull).

FIG. 20 is a screenshot showing sonomicrometry receiver crystals (at the area of arrow heads) implanted in soft gel substance simulating brain material within the plastic skull taken at the inferior aspect view of the plastic skull (i.e., interior of the plastic skull).

Figure 21:
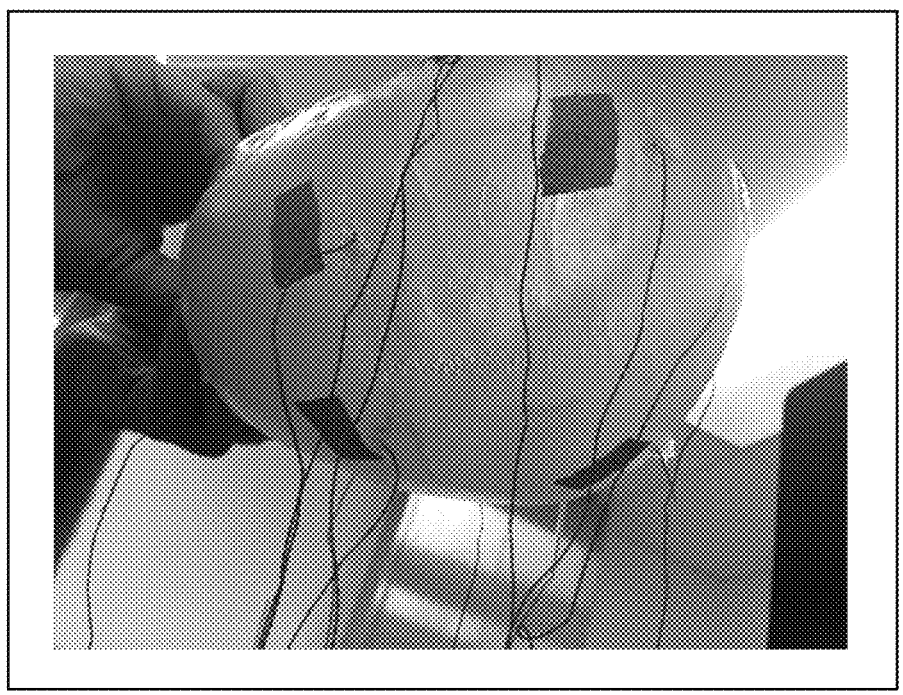
FIG. 21 is a screenshot showing the plastic skull having wires running inward to the brain material (not shown) taken at the superior aspect view of the plastic skull (i.e., exterior top view of the plastic skull).

FIG. 21 is a screenshot showing the plastic skull having wires running inward to the receivers (not shown) embedded in the brain material (not shown) taken at the superior aspect view of the plastic skull (i.e., exterior top view of the plastic skull).

Figure 22:
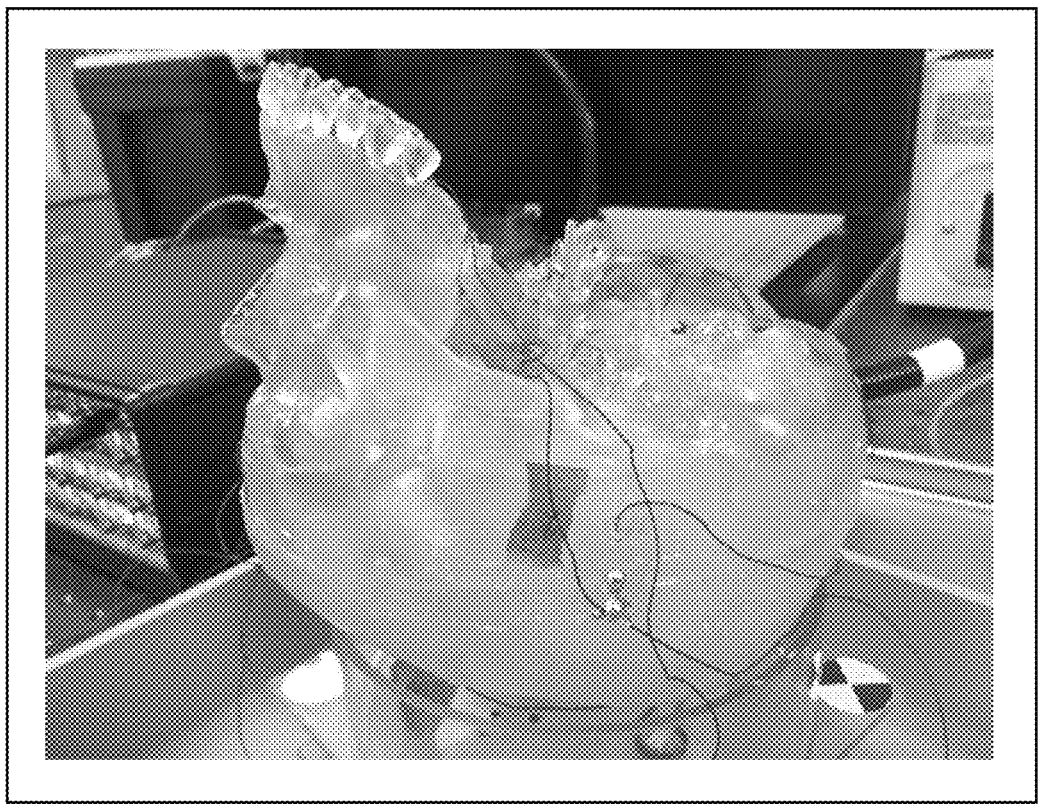
FIG. 22 is a screenshot showing the plastic skull having wires running inward to the receivers (not shown) to the brain material (not shown) taken at a lateral aspect view (i.e. side view) of right side of the plastic skull with the superior surface of the skull is resting on the table.

FIG. 22 is a screenshot showing the plastic skull having wires running inward to the receivers (not shown) in the brain material (not shown) taken at a lateral aspect view (i.e. side view) of the right side of the plastic skull with the superior surface of the skull is resting on a table surface.

Examples and Experimental Results Set No. 2

Referring generally to FIGS. 6-9, FIG. 6 schematically illustrates a system used in an in situ investigation depicting a setup for a crystal receiver device 21 insertion procedure whereby a cannula 5 is inserted to the required depth and the receiver 21 is pushed down the length of the cannula 5 into the brain 35. Also shown is a circuit or wire 15 configured to carry power to the transmitters 11 so as to activate a transmitter 11 to generate a mechanical wave 3 such as ultrasound. Also shown are data transmission circuit or wires 17 to communicate data with the transmitters 11. Also shown are data transmission circuit or wires 27 to communicate data with the receivers 21. Also shown is a circuit or wire 25 configured to carry power to the receivers 21 as needed. Further, a guide plate 6 and connectors 13, 23 may be provided. The connectors may be ports to seal or secure various components.

Also, in an embodiment, it should be appreciated that modes may be switched whereby a transmitter becomes a receiver or a receiver becomes a transmitter. Thus, these devices (transmitters and receivers) may be able to operate by providing either or both functions.

Figure 7:
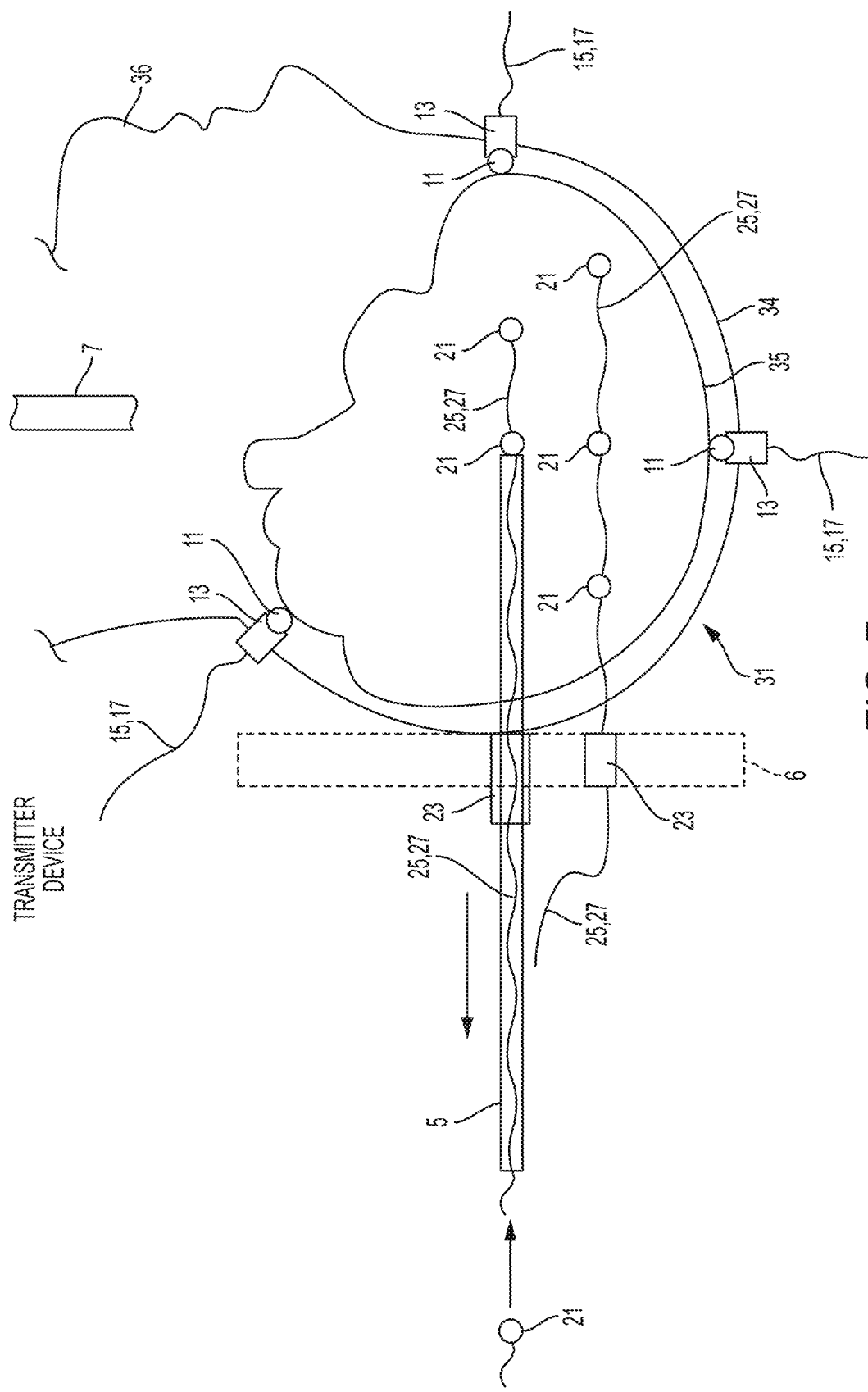
FIG. 7 schematically illustrates a system used in an in situ investigation depicting a setup for a crystal receiver device insertion procedure whereby a cannula is inserted to the required depth and another receiver is pushed down the length of the cannula into the brain.

FIG. 7 schematically illustrates a system used in an in situ investigation depicting a setup for a crystal receiver device 21 insertion procedure whereby a cannula 5 is inserted to the required depth and another receiver 21 is pushed down the length of the cannula 5 into the brain 35. For example, after once an initial crystal receiver is inserted, the cannula maybe retracted and then the next crystal receiver can be placed accordingly. This process may be repeated for any designated number of receivers or other components.

Figure 8:
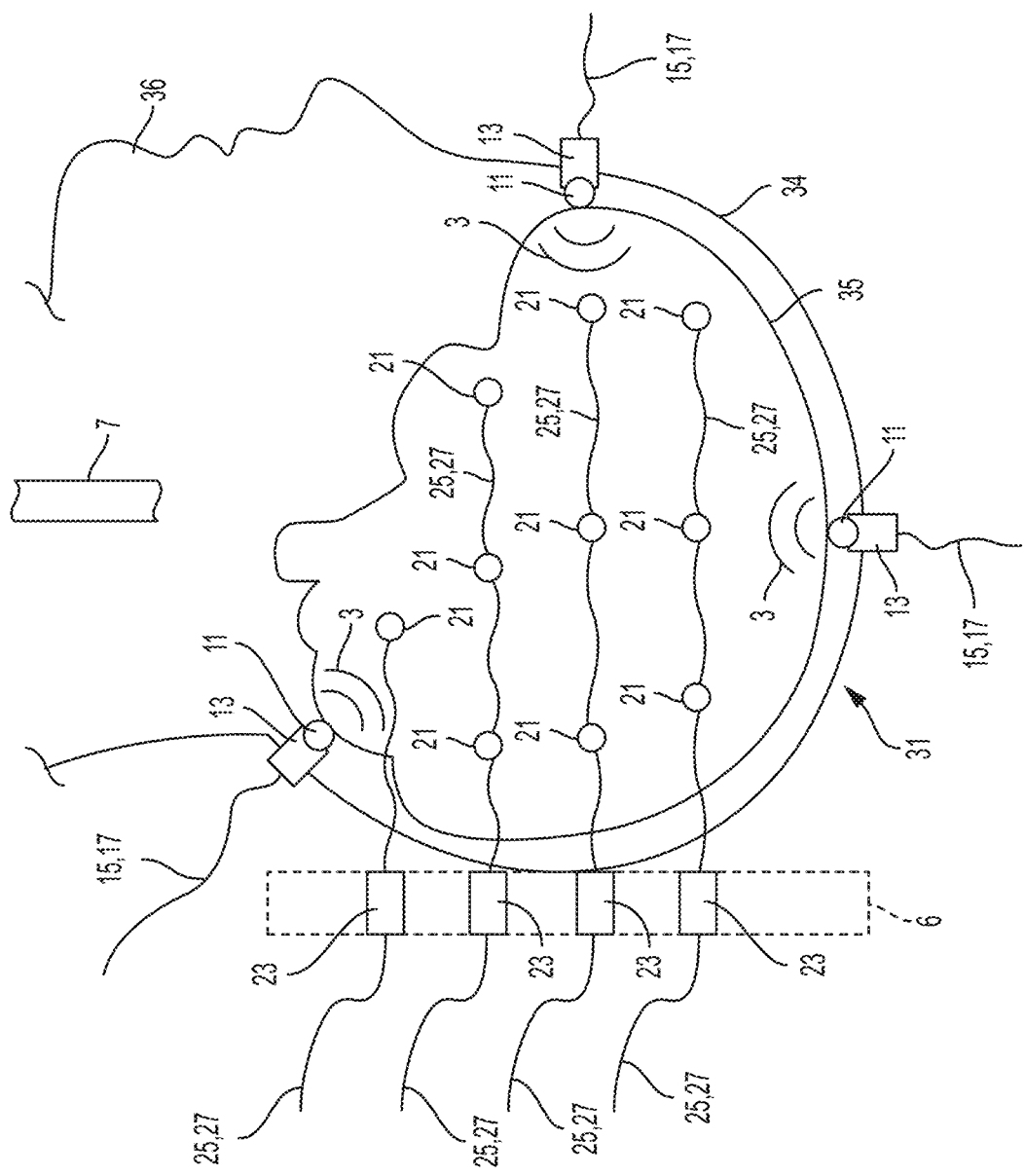
FIG. 8 schematically illustrates a system used in an in situ investigation depicting a setup for the transmitters sending ultrasound pulses, while the receivers recorded the signals.

FIG. 8 schematically illustrates a system used in an in situ investigation depicting a setup for the transmitters 11 sending ultrasound pulses 3, while the receivers 21 recorded the signals.

Figure 9:
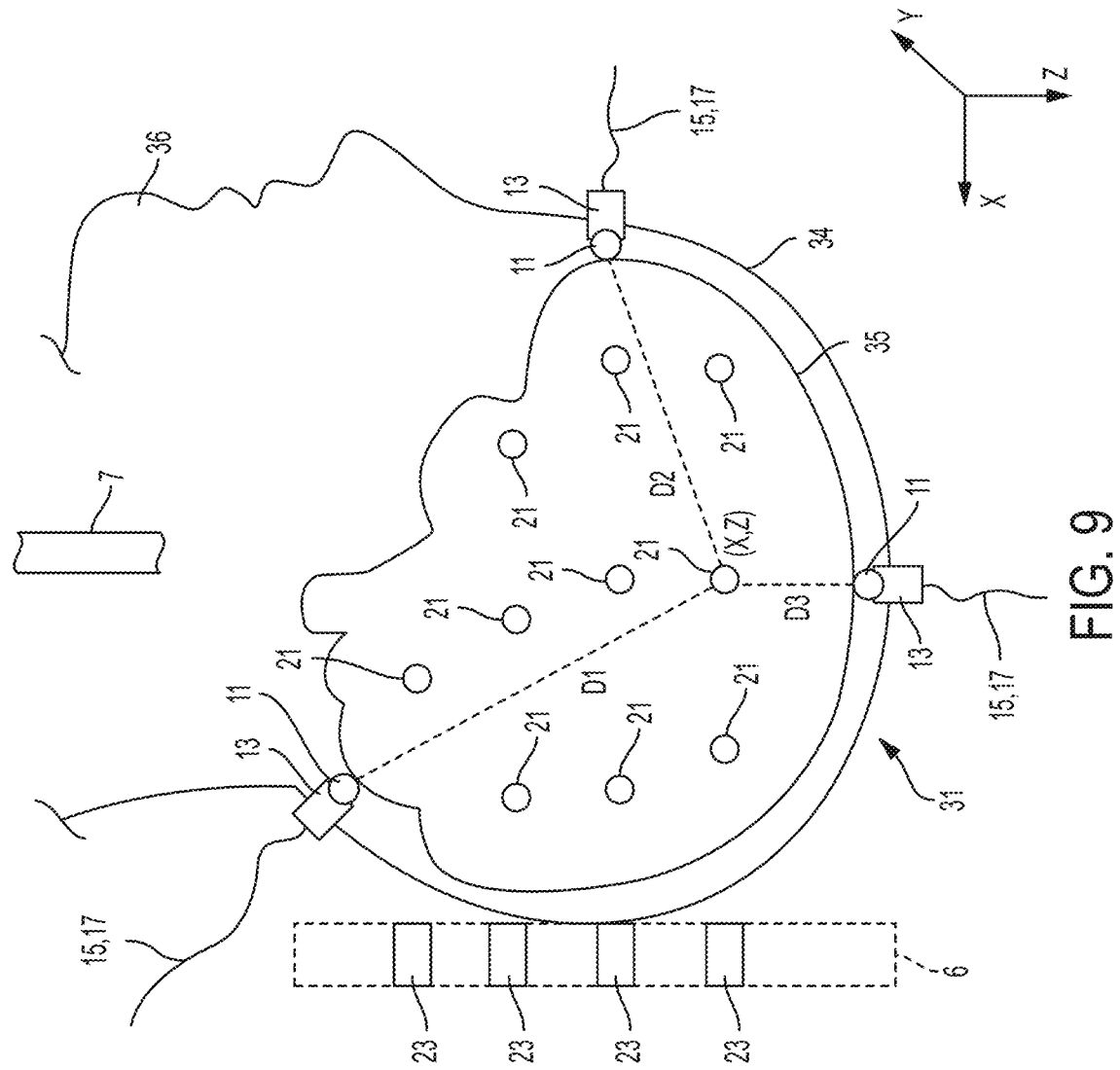
FIG. 9 schematically illustrates a system used in an in situ investigation depicting a setup for three crystal receiver-transmitter pairs to determine the 3D coordinates using trilateration.

FIG. 9 schematically illustrates a system used in an in situ investigation depicting a an aspect of an embodiment setup for a minimum of three crystal receiver 21-transmitter 11 pairs were necessary to find 3D coordinates using trilateration.

Examples and Experimental Results Set No. 3

Method:

A fresh cadaveric specimen (sex: male, age: 53 years, mass: 116 kg, height: 173 cm) was obtained 14 hours post mortem, and the head and cervical spine were dissected at the T1-T2 joint. An array of neutrally-dense targets was implanted into the brain tissue of the specimen using a minimally invasive cannula technique. These targets are piezoelectric sonomicrometry crystals (2-3 mm diameter) that are each capable of transmitting and receiving ultrasound pulses. Once implanted into tissue, the distance between each pair of sonomicrometry crystals can be determined by the time of flight of the ultrasound pulse travelling from one crystal to another. In this study, the sonomicrometry crystal array geometry was designed to maximise the volume over which the brain deformation was captured, while avoiding the periphery of the brain and the ventricles. Twenty-four receiving crystals were implanted into the brain tissue, and eight transmitting crystals were rigidly fixed to the inner surface of the skull to act as a fixed reference frame. Initial placement of all 32 crystals was documented using computed-tomography (CT) images acquired after the head was instrumented. During each test, point-to-point distances between transmitting and receiving crystals were recorded at 500 to 700 Hz, and trilateration was used to calculate the 3D coordinate-time histories for each crystal within the skull reference frame. The head/brain specimen was actively perfused with artificial cerebrospinal fluid to maintain the desired state of the brain, and to eliminate the presence of any air pockets that would interfere with the transmission of ultrasound.

Tests were performed with a rotational test device (RTD) designed to deliver controllable and repeatable pure-rotational pulses to the head about all three anatomical axes of rotation through the head centre of gravity (CG). The RTD was powered by a pneumatically driven, PID-controlled servohydraulic linear actuator system. A cable transmission system translated the linear output of the drive cylinder into a rotational pulse. A gearbox was used to allow rotation of the head in three orthogonal axes, while maintaining a consistent initial position of the head (inverted). Fifteen dynamic rotation tests were performed on the specimen, with four different rotation pulses (ranging from 20 rad/s to 40 rad/s peak angular velocity, with positive-phase velocity durations of 30-60 ms), three different rotation directions (sagittal, coronal, and axial), and three repeated tests at the highest severity levels. Head kinematics were acquired using an array of three linear accelerometers and three angular rate sensors. All data, including sonomicrometry displacements, were transformed to the head CG. All testing was performed on the specimen less than 60 hours post mortem.

Results:

Preliminary results show that sonomicrometry provided good quality and highly repeatable 3D deformation data for the brain. Following the load, the crystals consistently returned to their initial positions, indicating that they did not move relative to its surrounding tissue, and that these test conditions did not result in gross structural damage of the brain (as expected). Peak-to-peak crystal displacements as large as 8.5 mm, 9 mm, and 15 mm were measured in the sagittal, coronal, and axial rotation tests, respectively, for the 40 rad/s, 60 ms condition. Brain deformations were larger in axial rotation for a given loading condition than in the sagittal and coronal directions. The transient response of the brain was observed to last between 100 and 200 ms after the initiation of rotation, and the first mode natural frequency of the marker motion was found to be approximately 12 Hz. The repeated test condition (40 rad/s, 30 ms) indicated that the observed deformation time histories were highly repeatable.

Figure 23:
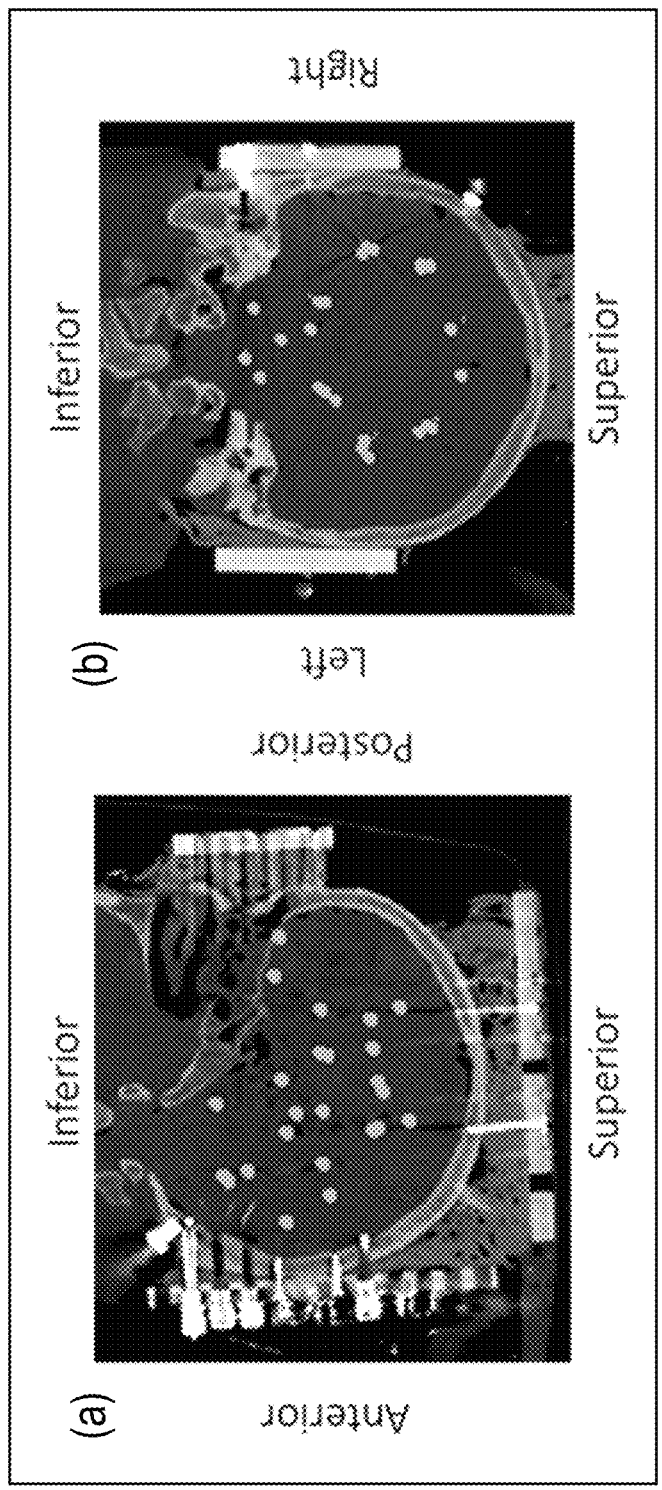
FIG. 23 is a screenshot showing: projected CT images of a brain illustrating the location of each of the sonomicrometry receiver crystals implanted in the brain taken at the sagittal plane (left portion listed as "a" in the screenshot); and projected CT images illustrating the location of each of the sonomicrometry receiver crystals implanted in the brain taken at the coronal plane (right portion listed as "b" in the screenshot). The receiver crystals reflected by the dots.
Figure 24:
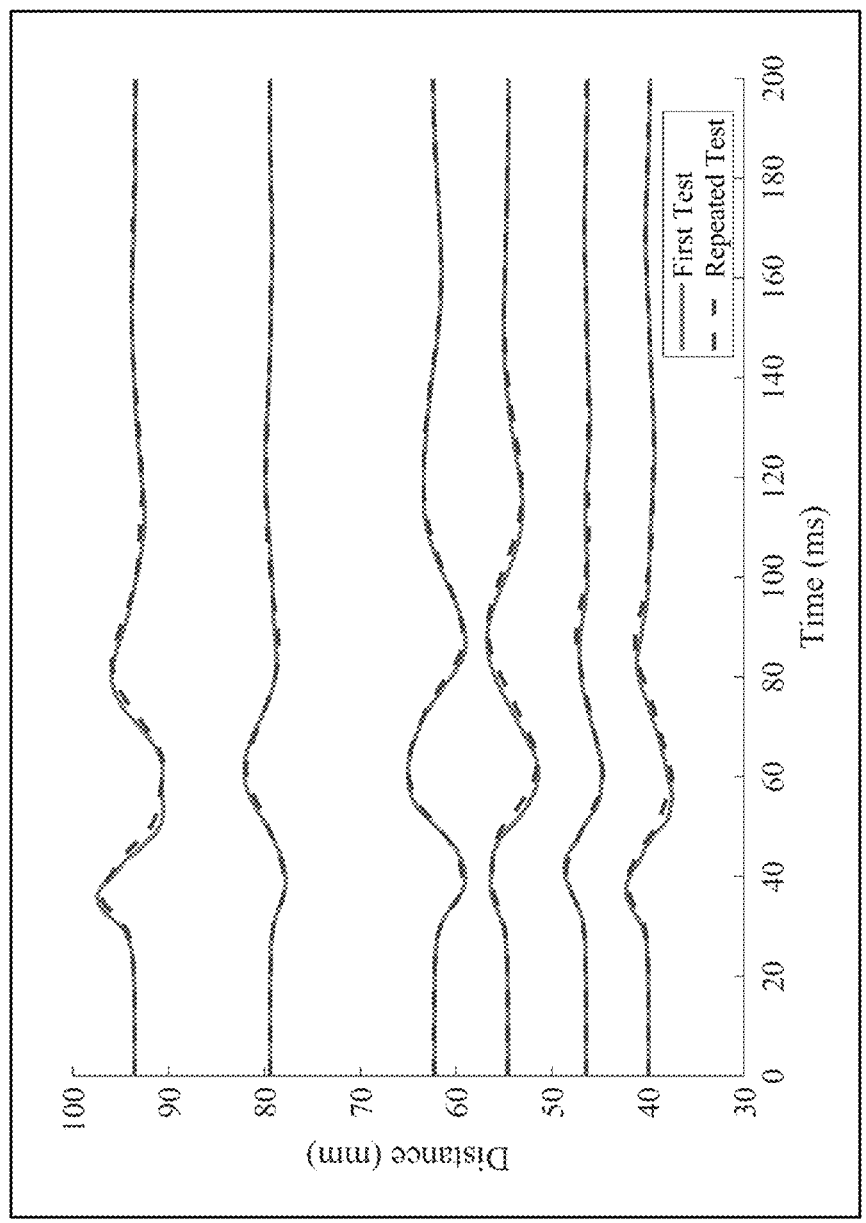
FIG. 24 is a screenshot showing the graphical representation of select point-to-point distance traces from the raw sonomicrometry data for the repeated coronal rotations, 40 rad/s, 30 m/s tests. A first test is designated with a solid line. A repeated test is designated with a dashed line.

Accordingly, some of the results are captured in FIGS. 23-24. FIG. 23 is a screenshot showing projected CT images of a brain illustrating the location of each of the sonomicrometry receiver crystals implanted in the brain taken at the sagittal plane (left portion listed as "a" in the screenshot). It may be noted that not shown are an additional eight transmitter crystals that were rigidly fixed to the inner surface of the skull. Similarly, FIG. 23 is a screenshot showing projected CT images illustrating the location of each of the sonomicrometry receiver crystals implanted in the brain taken at the coronal plane (right portion listed as "b" in the screenshot). It may be noted that not shown are an additional eight transmitter crystals that were rigidly fixed to the inner surface of the skull. The receiver crystals are reflected by the dots.

FIG. 24 is a screenshot showing the graphical representation of select point-to-point distance traces from the raw sonomicrometry data for the repeated coronal rotations, 40 rad/s, 30 m/s tests. A first test is designated with a solid line. A repeated test is designated with a dashed line.

Figure 25:
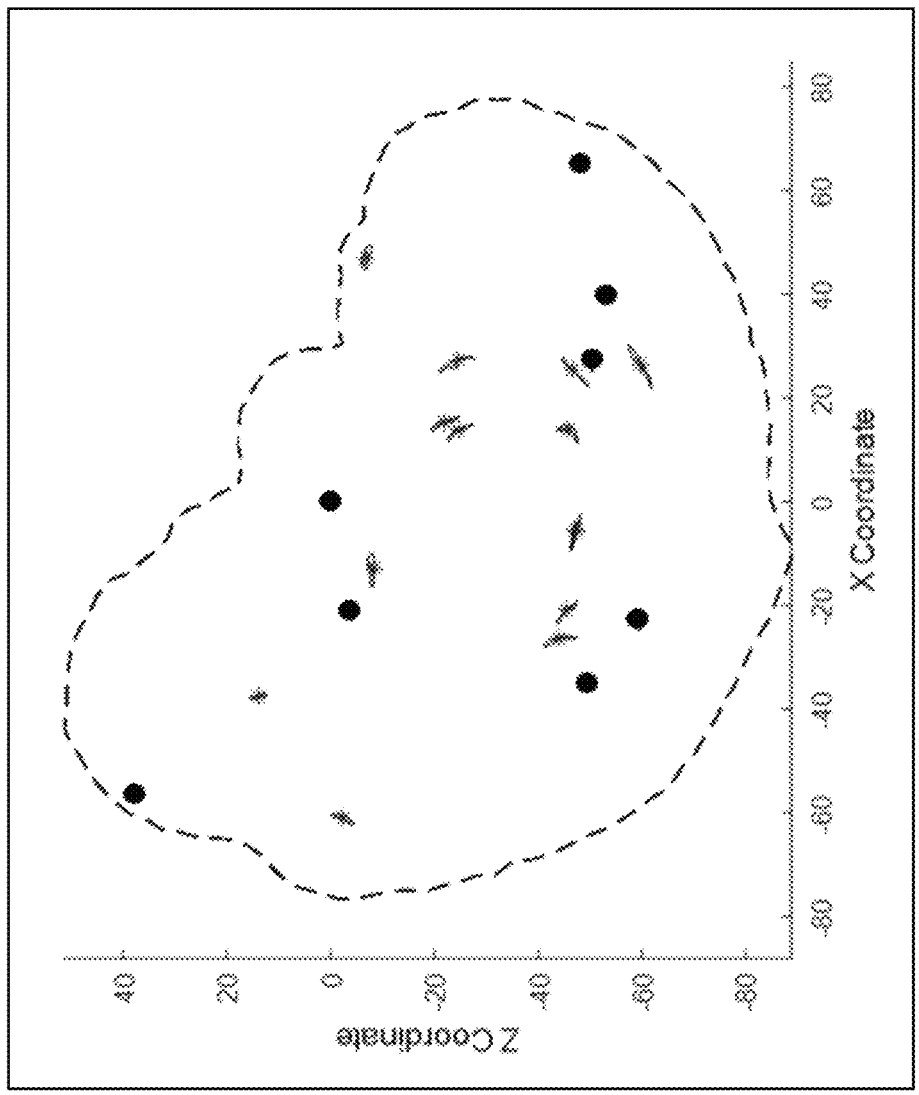
FIG. 25 is a screenshot showing the trilaterated trajectories of the crystals implanted in the brain from select tests (all 40 rad/s, 60 ms) in the skull reference frame. The plot shows the results of one test with rotation in the sagittal plane. The asterisks indicate the initial positions of the receiver crystals implanted into the brain tissue, with trajectory traces shown (indicated by elongation pattern) projected in the plane of rotation. The dots indicate the positions of the eight transmitter crystals affixed to the skull.
Figure 26:
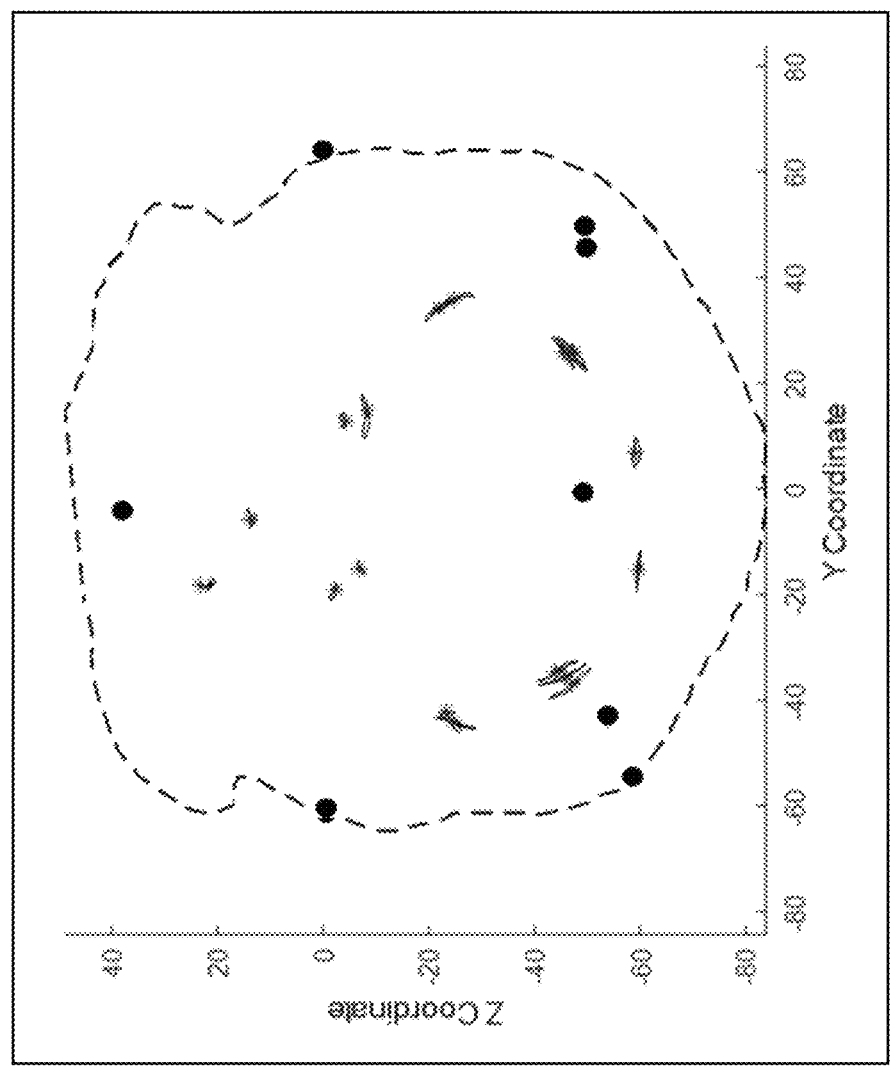
FIG. 26 is a screenshot showing the trilaterated trajectories of the crystals implanted in the brain from select tests (all 40 rad/s, 60 ms) in the skull reference frame. The plot shows the results of one test with rotation in the coronal plane. The asterisks indicate the initial positions of the receiver crystals implanted into the brain tissue, with trajectory traces shown (indicated by elongation pattern) projected in the plane of rotation. The dots indicate the positions of the eight transmitter crystals affixed to the skull.
Figure 27:
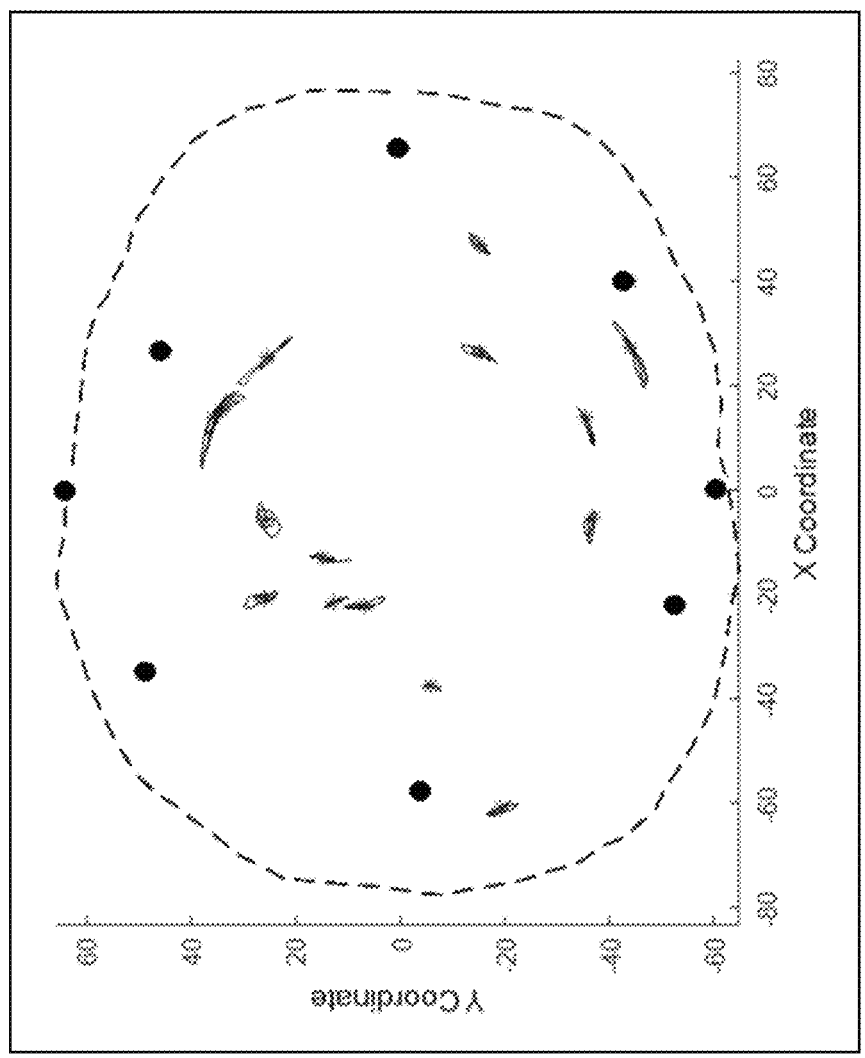
FIG. 27 is a screenshot showing the trilaterated trajectories of the crystals implanted in the brain from select tests (all 40 rad/s, 60 ms) in the skull reference frame. The plot shows the results of one test with rotation in the axial plane. The asterisks indicate the initial positions of the receiver crystals implanted into the brain tissue, with trajectory traces shown (indicated by elongation pattern) projected in the plane of rotation. The dots indicate the positions of the eight transmitter crystals affixed to the skull.

Still yet, some of the results are captured in FIGS. 25-27. FIG. 25 is a screenshot showing the trilaterated trajectories of the crystals implanted in the brain from select tests (all 40 rad/s, 60 ms) in the skull reference frame. The plot shows the results of one test with rotation in the sagittal plane. The asterisks indicate the initial positions of the receiver crystals implanted into the brain tissue, with trajectory traces (indicated by elongation pattern) shown projected in the plane of rotation. The dots indicate the positions of the eight transmitter crystals affixed to the skull.

FIG. 26 is a screenshot showing the trilaterated trajectories of the crystals implanted in the brain from select tests (all 40 rad/s, 60 ms) in the skull reference frame. The plot shows the results of one test with rotation in the coronal plane. The asterisks indicate the initial positions of the receiver crystals implanted into the brain tissue, with trajectory traces (indicated by elongation pattern) shown projected in the plane of rotation. The dots indicate the positions of the eight transmitter crystals affixed to the skull.

FIG. 27 is a screenshot showing the trilaterated trajectories of the crystals implanted in the brain from select tests (all 40 rad/s, 60 ms) in the skull reference frame. The plot shows the results of one test with rotation in the axial plane. The asterisks indicate the initial positions of the receiver crystals implanted into the brain tissue, with trajectory traces (indicated by elongation pattern) shown projected in the plane of rotation. The dots indicate the positions of the eight transmitter crystals affixed to the skull.

Discussion:

The results presented in this study suggest that sonomicrometry is an effective tool for measuring 3D in situ brain deformation during dynamic head rotation. Compared to other approaches, such as bi-planar X-ray, sonomicrometry allowed for a single instrumented specimen to be tested in a range of impact severities, without line-of-sight or test volume constraints. Both the sonomicrometry and the mechanical test device proved to be highly repeatable, which will be crucial for developing biomechanical response targets for brain FE model validation. Future investigation will include increasing the sample size with additional cadaveric specimens to create brain deformation response corridors for FE model validation. This methodology may also be extended in the future to other potential brain injury environments, including direct head impact and other types of loading.

ADDITIONAL EXAMPLES

Example 1

A system, comprising: an anthropomorphic test device (ATD); an acoustic transmitter device located on a first region of said ATD; an acoustic receiver device located on a second region of said ATD; power circuit configured to provide an electric field in communication with said acoustic transmitter to activate said acoustic transmitter to generate mechanical waves to be received by said acoustic receiver; a location determination circuit comprising a memory circuit and processor circuit, the memory circuit comprising instructions that when executed by the processor circuit, cause the location determination circuit to determine relative locations of said acoustic transmitter device and said acoustic receiver device by the time of flight of the generated mechanical wave traveling from said acoustic transmitter device to said acoustic receiver device while said first region of said ATD and/or said second region of said ATD are subjected to movement and/or deformation; and said memory circuit comprising instructions that when executed by the processor circuit, said movement of said second region of said ATD is determined that provides movement and/or deformation data of said second region of said ATD.

Example 2

The system of example 1, wherein said memory circuit further comprises repeating the instructions, executed by the processor circuit, for a predetermined duration or number of repetitions for causing the location determination circuit to determine relative locations of said acoustic transmitter device and said acoustic receiver device by the time of flight for the respective repeated generated mechanical waves traveling from said acoustic transmitter device to said acoustic receiver device while said first region of said ATD and/or said second region of said ATD are subjected to movement and/or deformation.

Example 3

The system of example 1 (as well as subject matter in whole or in part of example 2), wherein said acoustic transmitter device and said acoustic receiver device are a piezoelectric device.

Example 4

The system of example 1 (as well as subject matter of one or more of any combination of examples 2-3, in whole or in part), wherein said mechanical waves are ultrasonic soundwaves.

Example 5

The system of example 1 (as well as subject matter of one or more of any combination of examples 2-4, in whole or in part), wherein the determination of the relative locations of said acoustic transmitter device and said acoustic receiver device is provided by sonomicrometry.

Example 6

The system of example 1 (as well as subject matter of one or more of any combination of examples 2-5, in whole or in part), wherein said determining of the relative locations of said acoustic transmitter device and said acoustic receiver device is provided by a computerized geometric algorithm.

Example 7

The system of example 6 (as well as subject matter of one or more of any combination of examples 2-6, in whole or in part), wherein said computerized geometric algorithm is a trilateration process or a triangulation process.

Example 8

The system of example 1 (as well as subject matter of one or more of any combination of examples 2-7, in whole or in part), wherein said movement and/or deformation is resultant from extrinsic loading condition incurred by said ATD and/or intrinsic loading condition incurred by said ATD.

Example 9

The system of example 8, where said extrinsic loading condition is rotational force.

Example 10

The system of example 9, wherein said rotational force includes three different rotational directions in the x, y, and z plane coordinates.

Example 11

The system of example 8 (as well as subject matter of one or more of any combination of examples 9-10, in whole or in part), wherein said extrinsic loading is the force incurred due to simulated medical procedures on said ATD.

Example 12

The system of example 11, wherein said simulated medical procedure includes a simulated surgical procedure on said ATD.

Example 13

The system of example 12, wherein said simulated surgical procedure includes a stereotactic tracking procedure on said ATD.

For example, the medical or surgical procedure may include the ability to allow a user to see the internal structure or function of one or more regions of an ATD. A predetermined number of transmitters and receivers may be installed on one or more regions of an ATD. The one or more regions of the ATD may be inclusive of a variety of anatomical regions disclosed herein as part of the ATD. Moreover, a predetermined number of transmitters and receivers may be installed on one or more medical instruments or tools placed in or on the ATD. The placement of the transmitters and receivers on the anatomical regions, regions of the ATD, and medical instruments and tools will enable the user to watch or track the motion or deformation of the anatomical regions, regions of ATD, and medical instruments and tools.

Example 14

The system of example 11 (as well as subject matter of one or more of any combination of examples 12-13, in whole or in part), wherein said simulated medical procedure includes simulated physical rehabilitation procedure on said ATD.

Example 15

The system of example 14, wherein said simulated physical rehabilitation procedure includes joint dislocation manipulation and reduction on said ATD.

Example 16

The system of example 11 (as well as subject matter of one or more of any combination of examples 12-15, in whole or in part), wherein said simulated medical procedure includes simulated diagnostic procedures on said ATD.

Example 17

The system of example 16, wherein said simulated diagnostic procedure includes endoscopy procedure or laparoscopy procedure on said ATD.

Example 18

The system of example 11 (as well as subject matter of one or more of any combination of examples 12-17, in whole or in part), wherein said simulated medical procedure includes simulated cardiopulmonary resuscitation (CPR) on said ATD.

For example, the medical procedure may include the ability to allow a user to simulate, conduct, investigate, or practice physical rehabilitation procedures, joint dislocation manipulation and reduction procedures, endoscopic or laparoscopic procedures, or CPR procedure as they are applied to the internal structure or function of one or more regions of an ATD. A predetermined number of transmitters and receivers may be installed on one or more regions of an ATD. The one or more regions of the ATD may be inclusive of a variety of anatomical regions disclosed herein as part of the ATD. Moreover, a predetermined number of transmitters and receivers may be installed on one or more medical instruments or tools placed in or on the ATD (as well as placed on the user herself/himself). The placement of the transmitters and receivers on the anatomical regions, regions of the ATD, and medical instruments and tools (as well any placed on the user herself/himself) will enable the user to watch or track the motion and deformation of the anatomical regions, regions of ATD, and medical instruments and tools (as well as motion of the user herself/himself).

Example 19

The system of example 8 (as well as subject matter of one or more of any combination of examples 1-7 and 9-18, in whole or in part), wherein said intrinsic loading is the force incurred due to simulated anatomical operations of said ATD.

Example 20

The system of example 19, wherein said simulated anatomical operation includes dynamic movement of a simulated organ.

Example 21

The system of example 19 (as well as subject matter in whole or in part of example 20), wherein said simulated anatomical operation includes dynamic movement of a simulated vasculature system.

Example 22

The system of example 1 (as well as subject matter of one or more of any combination of examples 2-21, in whole or in part), wherein said ATD is a crash test dummy.

Example 23

The system of example 22, further comprising: a crash test track system, wherein said crash test track system is configured to receive said crash test dummy.

Example 24

The system of example 1 (as well as subject matter of one or more of any combination of examples 2-23, in whole or in part), wherein said ATD is mounted in communication with a third region of said ATD.

Example 25

The system of example 24, wherein said third region of said ATD is a crash test dummy.

Example 26

The system of example 25, further comprising: a crash test track system, wherein said crash test track system is configured to receive said crash test dummy.

Example 27

The system of example 1 (as well as subject matter of one or more of any combination of examples 2-26, in whole or in part), wherein said first region of said ATD is a simulated skull component of said ATD.

Example 28

The system of example 27, wherein said simulated skull component comprises a polymer material or metal material.

Example 29

The system of example 27 (as well as subject matter in whole or in part of example 28), wherein said second region of said ATD is a simulated brain component of said ATD.

Example 30

The system of example 29, wherein said simulated brain component comprises a gel material.

Example 31

The system of example 1 (as well as subject matter of one or more of any combination of examples 2-30, in whole or in part), wherein said first region of said ATD is a simulated skeletal component of said ATD.

Example 32

The system of example 31, wherein said second region of said ATD is a simulated organ component of said ATD.

Example 33

The system of example 1 (as well as subject matter of one or more of any combination of examples 2-32, in whole or in part), wherein said first region of said ATD and said second region of said ATD are different portions of a same simulated organ component of said ATD.

Example 34

The system of example 1 (as well as subject matter of one or more of any combination of examples 2-33, in whole or in part), wherein said first region of said ATD and said second region of said ATD are different portions of a same simulated skeletal component of said ATD.

Example 35

The system of example 1 (as well as subject matter of one or more of any combination of examples 2-34, in whole or in part), wherein said first region of said ATD and said second region of said ATD are different portions of a same simulated body cavity component of said ATD.

Example 36

The system of example 1 (as well as subject matter of one or more of any combination of examples 2-35, in whole or in part), wherein said first region of said ATD is a simulated first organ component of said ATD and said second region of an ATD is a simulated second organ component of said ATD.

Example 37

The system of example 1 (as well as subject matter of one or more of any combination of examples 2-36, in whole or in part), wherein said first region of said ATD is a simulated first skeletal component of said ATD and said second region of said ATD is a simulated second skeletal component of said ATD.

Example 38

The system of example 1 (as well as subject matter of one or more of any combination of examples 2-37, in whole or in part), wherein said first region of said ATD is a simulated first body cavity component of said ATD and said second region of said ATD is a simulated second body cavity component of said ATD.

Example 39

The system of example 1 (as well as subject matter of one or more of any combination of examples 2-38, in whole or in part), wherein said movement and deformation of said second region is in a two-dimensional direction in said ATD.

Example 40

The system of example 1 (as well as subject matter of one or more of any combination of examples 2-39, in whole or in part), wherein said movement and/or deformation of said second region is in the following: two-dimensional plane direction in said ATD or three-dimensional space in said ATD.

Example 41

The system of example 1 (as well as subject matter of one or more of any combination of examples 2-40, in whole or in part), wherein said movement and/or deformation of the second region is one or more of any combination of following rotational plane directions in said ATD: sagittal, coronal, or axial.

Example 42

The system of example 1 (as well as subject matter of one or more of any combination of examples 2-41, in whole or in part), wherein the instructions, when performed by said processor circuit, cause the location determination circuit to perform at least one of: transmit information representing the movement and/or deformation data of said second region, or present the information representing the movement and/or deformation data of said second region on a display.

Example 43

The system of example 1 (as well as subject matter of one or more of any combination of examples 2-42, in whole or in part), wherein said first region of said ATD and/or second region of said ATD are each one or more of any combination of the following: body cavity, organ, skeletal component, vascular system component, nervous system component, musculoskeletal system component, or joint component.

For example, the body cavity may include, but not limited thereto, the following: oral cavity, cranial cavity, spinal cavity, ventral cavity, thoracic cavity, pleural cavities, pericardial cavity, abdominopelvic cavity, abdominal cavity, and pelvic cavity.

For example, the organ may include, but not limited thereto, the following: brain, heart, kidneys, liver, pancreas, stomach, small intestine, large intestine, lungs, muscles, and skin.

For example, a skeletal component may represent various bones of a human or other subject. For instance, the human adult skeleton is made up of 206 bones. For example, the skeletal component may include, but not limited thereto, the following: skull—cranium, mandible and maxilla; shoulder girdle—clavicle and scapula; arm—humerus, radius and ulna; hand—carpals, metacarpals and phalanges; chest—sternum and ribs; spine—cervical area, thoracic area, lumbar area, sacrum area and coccyx area; pelvic girdle—ilium, pubis and ischium; leg—femur, tibia and fibula; ankle—talus and calcaneus; and foot—tarsals, metatarsals and phalanges.

The vascular system is also called circulatory system. For example, the vascular system is made up of made up of the vessels that carry blood and lymph through the body. The arteries and veins carry blood throughout the body.

The nervous system is a complex network of nerves and cells that carry messages to and from the brain and spinal cord to various parts of the body. The Central nervous system is made up of the brain and spinal cord and the peripheral nervous system, which is made up of the somatic and the autonomic nervous systems.

The musculoskeletal system is made up of the bones of the skeleton, muscles, cartilage, tendons, ligaments, joints, and other connective tissue that supports and binds tissues and organs together.

Joints, also known as articulations, are strong connections that join the bones, teeth, and cartilage of the body to one another. Each joint is specialized in its shape and structural components to control the range of motion between the parts that it connects.

Example 44

An automated method of determining movement and/or deformation of an anthropomorphic test device (ATD), said method comprising: supplying an acoustic transmitter device located on a first region of said ATD; supplying an acoustic receiver device located on a second region of said ATD; providing an electric field in communication with said acoustic transmitter to activate said acoustic transmitter for generating mechanical waves to be received by said acoustic receiver; determining relative locations of said acoustic transmitter device and said acoustic receiver device by the time of flight of the generated mechanical wave traveling from said acoustic transmitter device to said acoustic receiver device while said first region of said ATD and/or said second region of said ATD are subjected to movement and/or deformation; and determining movement and/or deformation data of said second region of said ATD, and transmitting information representing the movement and/or deformation data of said second region, or presenting the information representing the movement and/or deformation data of said second region on a display.

Example 45

The method of example 44, wherein repeating the determining of relative locations of said acoustic transmitter device and said acoustic receiver device by the time of flight for a predetermined duration or number of repetitions for determining relative locations of said acoustic transmitter device and said acoustic receiver device by the time of flight for the respective repeated generated mechanical waves traveling from said acoustic transmitter device to said acoustic receiver device while said first region of said ATD and/or said second region of said ATD are subjected to movement and/or deformation.

Example 46

The method of example 44 (as well as subject matter in whole or in part of example 45), wherein said acoustic transmitter device and said acoustic receiver device are a piezoelectric device.

Example 47

The method of example 44 (as well as subject matter of one or more of any combination of examples 45-46, in whole or in part), wherein said mechanical waves are ultrasonic soundwaves.

Example 48

The method of example 44 (as well as subject matter of one or more of any combination of examples 45-47, in whole or in part), wherein the determining of the relative locations of said acoustic transmitter device and said acoustic receiver device comprises applying a sonomicrometry process.

Example 49

The method of example 44 (as well as subject matter of one or more of any combination of examples 45-48, in whole or in part), wherein said determining of the relative locations of said acoustic transmitter device and said acoustic receiver device is comprises applying a computerized geometric algorithm process.

Example 50

The method of example 49, wherein said computerized geometric algorithm is a trilateration process or a triangulation process.

Example 51

A non-transitory computer readable medium having computer program logic that when implemented enables one or more to processors to determine movement and/or deformation of an anthropomorphic test device (ATD), said computer program logic comprising: determining relative locations of an acoustic transmitter device and an acoustic receiver device by the time of flight based on data received by a generated mechanical wave traveling from said acoustic transmitter device to said acoustic receiver device while said first region of said ATD and/or said second region of said ATD are subjected to movement and/or deformation; and determining movement and/or deformation data of said second region of said ATD, and transmitting information representing the movement and/or deformation data of said second region, or presenting the information representing the movement and/or deformation data of said second region on a display.

Example 52

A non-transitory machine readable medium including instructions for determining movement and/or deformation of an anthropomorphic test device (ATD), which when executed by a machine, cause the machine to: determine relative locations of an acoustic transmitter device and an acoustic receiver device by the time of flight based on data received by a generated mechanical wave traveling from said acoustic transmitter device to said acoustic receiver device while said first region of said ATD and/or said second region of said ATD are subjected to movement and/or deformation; and determine movement and/or deformation data of said second region of said ATD, and transmit information representing the movement and/or deformation data of said second region, or present the information representing the movement and/or deformation data of said second region on a display.

Example 53

The method of using any of the devices, systems, apparatuses, assemblies, or their components provided in any one or more of examples 1-43, in whole or in part.

Example 54

The method of manufacturing any of the devices, systems, apparatuses, assemblies, or their components provided in any one or more of examples 1-44, in whole or in part.

Example 55

An apparatus including subject matter of one or more of any combination of examples 1-43, in whole or in part.

Example 56

The non-transitory computer readable medium of example 51, wherein the computer program logic when implemented enables one or more to processors to perform any of the subject matter in whole or in part of the methods or processes provided in examples 44-50.

Example 57

The non-transitory machine readable medium of example 51, including instructions which when executed by a machine causes the machine to perform any of the subject matter in whole or in part of the methods or processes provided in examples 44-50.

REFERENCES

The devices, systems, apparatuses, compositions, materials, machine readable medium, computer program products, and methods of various embodiments of the invention disclosed herein may utilize aspects disclosed in the following references, applications, publications and patents and which are hereby incorporated by reference herein in their entirety, and which are not admitted to be prior art with respect to the present invention by inclusion in this section:

1. Lee, Ka Yan, et al., "Blast-induced electromagnetic fields in the brain from bone piezoelectricity", NeuroImage 54 (2011), pgs. S30-S36.
2. Ryan, Jonathon B., et al., "Functional Evidence of Reversible Ischemic Injury Immediately After the Sympathetic Storm Associated with Experimental Brain Death", The Journal of Heart and Lung Transplantation", 2003, Vol. 22, No. 8., pgs. 922-928.
3. Giudice, J. Sebastian, et al., "Measuring 3D Brain Deformation During Dynamic Head Motion Using Sonomicrometry", Pgs. 674-676, IRC-17-89, 2017 IRCOBI Conference Proceedings, 13-15 Sep. 2017, Antwerp, Belgium.
4. Alshareef, Ahmed, et al., "Evaluating the Biofidelity of Human Brain Finite, Element Models Using Sonomicrometry Data", Pgs. 701-702, IRC-17-96, 2017 IRCOBI Conference Proceedings, 13-15 Sep. 2017, Antwerp, Belgium.
5. Alshareef, A., et al., "Novel Method for Quantifying Human In Situ Whole Brain Deformation Under Rotational Loading Using Sonomicrometry", Pgs. 1-31, Journal of Neurotrauma", November 2017, ahead of print, https://doi.org/10.1089/neu.2017.5362.
6. Rouhana, S., et al., "Development of a Reusable, Rate-Sensitive Abdomen for the Hybrid III Family of Dummies", SAE Technical Paper Series, Pgs. 1-29, 45$^{th}$ Stapp Car Crash Conference, San Antonio, Tex., November, 2001 (P-375
7. Darling, T., "Finite Element Modeling of Human Brain Response to Football Helmet Impacts"—Thesis, Pgs. 1-63, Approved November 2014 by the Graduate Supervisory Committee (Arizona State University—December 2014).
8. Takhounts, E., et al., "On the Development of the SIMon Finite Element Head Model", Stapp Car Crash Journal, Vol. 47 (October 2003), Pgs. 107-133.

Unless clearly specified to the contrary, there is no requirement for any particular described or illustrated activity or element, any particular sequence or such activities, any particular size, speed, material, duration, contour, dimension or frequency, or any particularly interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. It should be appreciated that aspects of the present invention may have a variety of sizes, contours, shapes, compositions and materials as desired or required.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

We claim:

1. A system, comprising:
an anthropomorphic test device (ATD);
an acoustic transmitter device located on a first region of said ATD;
an acoustic receiver device located on a second region of said ATD;
power circuit configured to provide an electric field in communication with said acoustic transmitter to activate said acoustic transmitter to generate mechanical waves to be received by said acoustic receiver;
a location determination circuit comprising a memory circuit and processor circuit, the memory circuit comprising instructions that when executed by the processor circuit, cause the location determination circuit to determine relative locations of said acoustic transmitter device and said acoustic receiver device by the time of flight of the generated mechanical wave traveling from said acoustic transmitter device to said acoustic receiver device while said first region of said ATD and/or said second region of said ATD are subjected to movement and/or deformation; and
said memory circuit comprising instructions that when executed by the processor circuit, said movement of said second region of said ATD is determined that provides movement and/or deformation data of said second region of said ATD.

2. The system of claim 1, wherein said memory circuit further comprises repeating the instructions, executed by the processor circuit, for a predetermined duration or number of repetitions for causing the location determination circuit to determine relative locations of said acoustic transmitter device and said acoustic receiver device by the time of flight for the respective repeated generated mechanical waves traveling from said acoustic transmitter device to said acoustic receiver device while said first region of said ATD and/or said second region of said ATD are subjected to movement and/or deformation.

3. The system of claim 1, wherein said acoustic transmitter device and said acoustic receiver device are a piezoelectric device.

4. The system of claim 1, wherein said mechanical waves are ultrasonic soundwaves.

5. The system of claim 1, wherein the determination of the relative locations of said acoustic transmitter device and said acoustic receiver device is provided by sonomicrometry.

6. The system of claim 1, wherein said determining of the relative locations of said acoustic transmitter device and said acoustic receiver device is provided by a computerized geometric algorithm.

7. The system of claim 6, wherein said computerized geometric algorithm is a trilateration process or a triangulation process.

8. The system of claim 1, wherein said movement and/or deformation is resultant from extrinsic loading condition incurred by said ATD and/or intrinsic loading condition incurred by said ATD.

9. The system of claim 8, where said extrinsic loading condition is rotational force.

10. The system of claim 9, wherein said rotational force includes three different rotational directions in the x, y, and z plane coordinates.

11. The system of claim 8, wherein said extrinsic loading is the force incurred due to simulated medical procedures on said ATD.

12. The system of claim 11, wherein said simulated medical procedure includes a simulated surgical procedure on said ATD.

13. The system of claim 12, wherein said simulated surgical procedure includes a stereotactic tracking procedure on said ATD.

14. The system of claim 11, wherein said simulated medical procedure includes simulated physical rehabilitation procedure on said ATD.

15. The system of claim 14, wherein said simulated physical rehabilitation procedure includes joint dislocation manipulation and reduction on said ATD.

16. The system of claim 11, wherein said simulated medical procedure includes simulated diagnostic procedures on said ATD.

17. The system of claim 16, wherein said simulated diagnostic procedure includes endoscopy procedure or laparoscopy procedure on said ATD.

18. The system of claim 11, wherein said simulated medical procedure includes simulated cardiopulmonary resuscitation (CPR) on said ATD.

19. The system of claim 8, wherein said intrinsic loading is the force incurred due to simulated anatomical operations of said ATD.

20. The system of claim 19, wherein said simulated anatomical operation includes dynamic movement of a simulated organ.

21. The system of claim 19, wherein said simulated anatomical operation includes dynamic movement of a simulated vasculature system.

22. The system of claim 1, wherein said ATD is a crash test dummy.

23. The system of claim 22, further comprising:
a crash test track system, wherein said crash test track system is configured to receive said crash test dummy.

24. The system of claim 1, wherein said ATD is mounted in communication with a third region of said ATD.

25. The system of claim 24, wherein said third region of said ATD is a crash test dummy.

26. The system of claim 25, further comprising:
a crash test track system, wherein said crash test track system is configured to receive said crash test dummy.

27. The system of claim 1, wherein said first region of said ATD is a simulated skull component of said ATD.

28. The system of claim 27, wherein said simulated skull component comprises a polymer material or metal material.

29. The system of claim 27, wherein said second region of said ATD is a simulated brain component of said ATD.

30. The system of claim 29, wherein said simulated brain component comprises a gel material.

31. The system of claim 1, wherein said first region of said ATD is a simulated skeletal component of said ATD.

32. The system of claim 31, wherein said second region of said ATD is a simulated organ component of said ATD.

33. The system of claim 1, wherein said first region of said ATD and said second region of said ATD are different portions of a same simulated organ component of said ATD.

34. The system of claim 1, wherein said first region of said ATD and said second region of said ATD are different portions of a same simulated skeletal component of said ATD.

35. The system of claim 1, wherein said first region of said ATD and said second region of said ATD are different portions of a same simulated body cavity component of said ATD.

36. The system of claim 1, wherein said first region of said ATD is a simulated first organ component of said ATD and said second region of an ATD is a simulated second organ component of said ATD.

37. The system of claim 1, wherein said first region of said ATD is a simulated first skeletal component of said ATD and said second region of said ATD is a simulated second skeletal component of said ATD.

38. The system of claim 1, wherein said first region of said ATD is a simulated first body cavity component of said ATD and said second region of said ATD is a simulated second body cavity component of said ATD.

39. The system of claim 1, wherein said movement and deformation of said second region is in a two-dimensional direction in said ATD.

40. The system of claim 1, wherein said movement and/or deformation of said second region is in the following:
two-dimensional plane direction in said ATD or three-dimensional space in said ATD.

41. The system of claim 1, wherein said movement and/or deformation of the second region is one or more of any combination of following rotational plane directions in said ATD:
sagittal, coronal, or axial.

42. The system of claim 1, wherein the instructions, when performed by said processor circuit, cause the location determination circuit to perform at least one of:
transmit information representing the movement and/or deformation data of said second region, or
present the information representing the movement and/or deformation data of said second region on a display.

43. The system of claim 1, wherein said first region of said ATD and/or second region of said ATD are each one or more of any combination of the following:
body cavity, organ, skeletal component, vascular system component, nervous system component, musculoskeletal system component, or joint component.

44. An automated method of determining movement and/or deformation of an anthropomorphic test device (ATD), said method comprising:
supplying an acoustic transmitter device located on a first region of said ATD;
supplying an acoustic receiver device located on a second region of said ATD;
providing an electric field in communication with said acoustic transmitter to activate said acoustic transmitter for generating mechanical waves to be received by said acoustic receiver;
determining relative locations of said acoustic transmitter device and said acoustic receiver device by the time of flight of the generated mechanical wave traveling from said acoustic transmitter device to said acoustic receiver device while said first region of said ATD and/or said second region of said ATD are subjected to movement and/or deformation; and
determining movement and/or deformation data of said second region of said ATD, and transmitting information representing the movement and/or deformation data of said second region, or presenting the information representing the movement and/or deformation data of said second region on a display.

45. The method of claim 44, wherein repeating the determining of relative locations of said acoustic transmitter device and said acoustic receiver device by the time of flight for a predetermined duration or number of repetitions for determining relative locations of said acoustic transmitter device and said acoustic receiver device by the time of flight for the respective repeated generated mechanical waves traveling from said acoustic transmitter device to said acoustic receiver device while said first region of said ATD and/or said second region of said ATD are subjected to movement and/or deformation.

46. The method of claim 44, wherein said acoustic transmitter device and said acoustic receiver device are a piezoelectric device.

47. The method of claim 44, wherein said mechanical waves are ultrasonic soundwaves.

48. The method of claim 44, wherein the determining of the relative locations of said acoustic transmitter device and said acoustic receiver device comprises applying a sonomicrometry process.

49. The method of claim 44, wherein said determining of the relative locations of said acoustic transmitter device and said acoustic receiver device comprises applying a computerized geometric algorithm process.

50. The method of claim 49, wherein said computerized geometric algorithm is a trilateration process or a triangulation process.

51. A non-transitory computer readable medium having computer program logic that when implemented enables one or more to processors to determine movement and/or deformation of an anthropomorphic test device (ATD), said computer program logic comprising:
determining relative locations of an acoustic transmitter device and an acoustic receiver device by the time of flight based on data received by a generated mechanical wave traveling from said acoustic transmitter device to said acoustic receiver device while said first region of said ATD and/or said second region of said ATD are subjected to movement and/or deformation; and
determining movement and/or deformation data of said second region of said ATD, and transmitting information representing the movement and/or deformation data of said second region, or presenting the information representing the movement and/or deformation data of said second region on a display.

* * * * *